(12) United States Patent
Wee et al.

(10) Patent No.: US 12,315,539 B2
(45) Date of Patent: May 27, 2025

(54) HEAT ASSISTED MAGNETIC RECORDING (HAMR) WRITE HEAD WITH ENHANCED STABILITY AND METHODS FOR MAKING THE SAME

(71) Applicant: WESTERN DIGITAL TECHNOLOGIES, INC., San Jose, CA (US)

(72) Inventors: Sung Hun Wee, Santa Clara, CA (US); Shawn Tanner, San Jose, CA (US); Hamid Balamane, Portola Valley, CA (US); Pradeep Senanayake, Fremont, CA (US); Takuya Matsumoto, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/234,248

(22) Filed: Aug. 15, 2023

(65) Prior Publication Data
US 2024/0135964 A1 Apr. 25, 2024
US 2024/0233757 A9 Jul. 11, 2024

Related U.S. Application Data

(60) Provisional application No. 63/380,261, filed on Oct. 20, 2022.

(51) Int. Cl.
*G11B 5/31* (2006.01)
*G11B 5/48* (2006.01)
(Continued)

(52) U.S. Cl.
CPC ............ *G11B 5/314* (2013.01); *G11B 5/3163* (2013.01); *G11B 5/4866* (2013.01);
(Continued)

(58) Field of Classification Search
None
See application file for complete search history.

(56) References Cited

U.S. PATENT DOCUMENTS 7,936,643 B2 * 5/2011 Takayama .............. G11B 5/314
369/13.13
9,202,481 B1 * 12/2015 Matsumoto .......... G11B 5/6082
(Continued)

*Primary Examiner* — Fred Tzeng
(74) *Attorney, Agent, or Firm* — PATTERSON + SHERIDAN, LLP

(57) ABSTRACT

A heat assisted magnetic recording (HAMR) write head contains a main pole, a waveguide, and a near-field transducer containing an antenna disposed between the waveguide and the main pole. A first portion of the antenna includes a layer stack of three or more gold-based component layers that contain a waveguide-side outermost gold-based component layer, a pole-side outermost gold-based component layer, and one or more intermediate gold-based component layers. An intermediate gold-based component layer of the one or more intermediate gold-based component layers includes at least one platinum group metal (PGM) at a maximum total atomic percentage that is greater than a total atomic percentage of the at least one PGM in the waveguide-side outermost gold-based component layer and is greater than a total atomic percentage of the at least one PGM in the pole-side outermost gold-based component layer.

18 Claims, 15 Drawing Sheets

(51) Int. Cl.
  *G11B 5/60* (2006.01)
  *G11B 13/08* (2006.01)
  *G11B 5/00* (2006.01)
(52) U.S. Cl.
  CPC ............ *G11B 5/6088* (2013.01); *G11B 13/08* (2013.01); *G11B 2005/0021* (2013.01)

(56) References Cited

U.S. PATENT DOCUMENTS

| | | | |
|---|---|---|---|
| 11,626,137 | B1* | 4/2023 | Fan .......................... G11B 5/02 369/13.33 |
| 2010/0073802 | A1* | 3/2010 | Komura ................. G11B 5/314 360/59 |
| 2010/0123967 | A1 | 5/2010 | Batra et al. |
| 2011/0211428 | A1 | 9/2011 | Batra et al. |
| 2013/0107390 | A1 | 5/2013 | Huang et al. |
| 2013/0286806 | A1 | 10/2013 | Wessel et al. |
| 2014/0313872 | A1 | 10/2014 | Rawat et al. |
| 2015/0187378 | A1 | 7/2015 | Peng et al. |
| 2015/0206545 | A1 | 7/2015 | Balamane et al. |
| 2015/0302878 | A1 | 10/2015 | Beaujour et al. |
| 2016/0329068 | A1* | 11/2016 | Matsumoto .......... G11B 5/3106 |
| 2016/0351208 | A1* | 12/2016 | Matsumoto .......... G11B 5/4866 |
| 2017/0047088 | A1* | 2/2017 | Matsumoto ............ G11B 5/314 |
| 2017/0047089 | A1 | 2/2017 | Rajauria et al. |
| 2018/0122407 | A1 | 5/2018 | Vossough et al. |
| 2019/0198053 | A1* | 6/2019 | Krichevsky ............ G11B 5/127 |
| 2019/0378539 | A1* | 12/2019 | Matsumoto .......... G11B 5/3133 |
| 2021/0027808 | A1 | 1/2021 | Matsumoto et al. |
| 2021/0398556 | A1* | 12/2021 | Stipe ...................... G11B 5/314 |
| 2022/0139422 | A1 | 5/2022 | Ho et al. |
| 2024/0096369 | A1* | 3/2024 | Cheng ................. G11B 5/4866 |

* cited by examiner

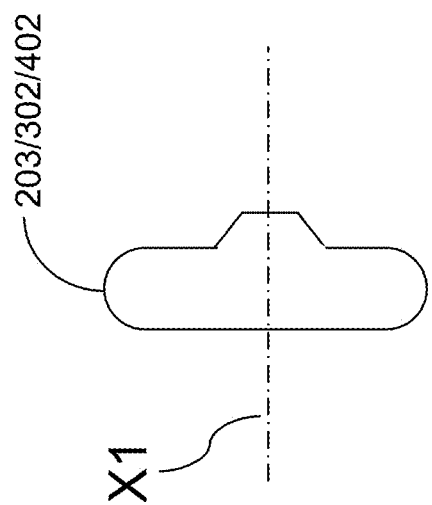
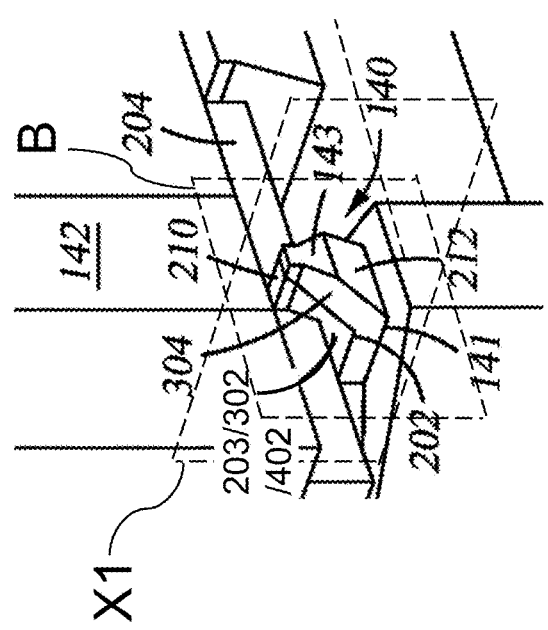
FIG. 5B
FIG. 5A

HEAT ASSISTED MAGNETIC RECORDING (HAMR) WRITE HEAD WITH ENHANCED STABILITY AND METHODS FOR MAKING THE SAME

FIELD

The present disclosure relates generally to the field of hard disk drives, and particularly to a HAMR write head including a near-field transducer having enhanced thermal-mechanical stability and methods of manufacturing the same.

BACKGROUND

Magnetic heads are employed to operate hard disk drives. A magnetic head can include a reading (i.e., read) head and a recording (i.e., writing or write) head. General structures and method of manufacture for prior art heat assisted magnetic recording (HAMR) write heads are disclosed, for example, in U.S. Patent Application Publication No. 2019/0378539 A1, the entire content of which is incorporated herein by reference.

In a magnetic disk device that employs a heat assisted magnetic recording (HAMR) write head, a near-field transducer (NFT) may be utilized to locally heat magnetic media having high coercivity during recording to lower the coercivity of the localized region. Gold is typically used for the NFT material to achieve a high optical efficiency, but the melting point of gold is low and deformation of the NFT is a problem when the NFT is heated for a long time. The NFT temperature is especially high near the point where the optical near-field is generated, and the maximum temperature may reach more than 150 degrees Celsius over the operational temperature of the magnetic disk device. When the NFT temperature is more than 150 degrees Celsius over the operational temperature of the magnetic disk device, atomic diffusion of gold atoms via surface, grain boundary, or lattice increases significantly, causing the NFT to deform.

SUMMARY

According to an aspect of the present disclosure, a heat assisted magnetic recording (HAMR) write head contains a main pole, a waveguide, and a near-field transducer containing an antenna disposed between the waveguide and the main pole. A first portion of the antenna includes a layer stack of three or more gold-based component layers that contain a waveguide-side outermost gold-based component layer, a pole-side outermost gold-based component layer, and one or more intermediate gold-based component layers. An intermediate gold-based component layer of the one or more intermediate gold-based component layers includes at least one platinum group metal (PGM) at a maximum total atomic percentage that is greater than a total atomic percentage of the at least one PGM in the waveguide-side outermost gold-based component layer and is greater than a total atomic percentage of the at least one PGM in the pole-side outermost gold-based component layer.

According to another aspect of the present disclosure, a method of forming a heat assisted magnetic recording (HAMR) write head is provided. The method comprises: forming a waveguide over a substrate; forming a first dielectric matrix layer over the waveguide; forming a recess cavity in the first dielectric matrix layer, the recess cavity having a tapered surface; sequentially depositing a layer stack of three or more gold-based component layers that contain a waveguide-side outermost gold-based component layer, a pole-side outermost gold-based component layer, and one or more intermediate gold-based component layers in the recess cavity, wherein an intermediate gold-based component layer of the one or more intermediate gold-based component layers includes at least one platinum group metal (PGM) at a maximum total atomic percentage that is greater than a total atomic percentage of the at least one PGM in the waveguide-side outermost gold-based component layer and is greater than a total atomic percentage of the at least one PGM in the pole-side outermost gold-based component layer; removing a portion of the layer stack that overlies a top surface of the first dielectric matrix layer by performing a planarization process to form an antenna having a first portion that includes a remaining portion of the layer stack after the planarization process; forming a second dielectric matrix layer over the antenna and the first dielectric matrix layer; forming a thermal shunt through the second dielectric matrix layer and into the antenna; and forming a main pole over the thermal shunt body portion.

BRIEF DESCRIPTION OF THE DRAWINGS

FIG. 5A is a perspective view of a region around a near-field transducer within the HAMR write heads of FIGS. 2A, 2B, 3A, 3B, 4A, and 4B according to an embodiment of the present disclosure.

FIG. 5B is top down cross-sectional view of the near-field transducer along the plane B of FIG. 5A.

DETAILED DESCRIPTION

Figure 1A:
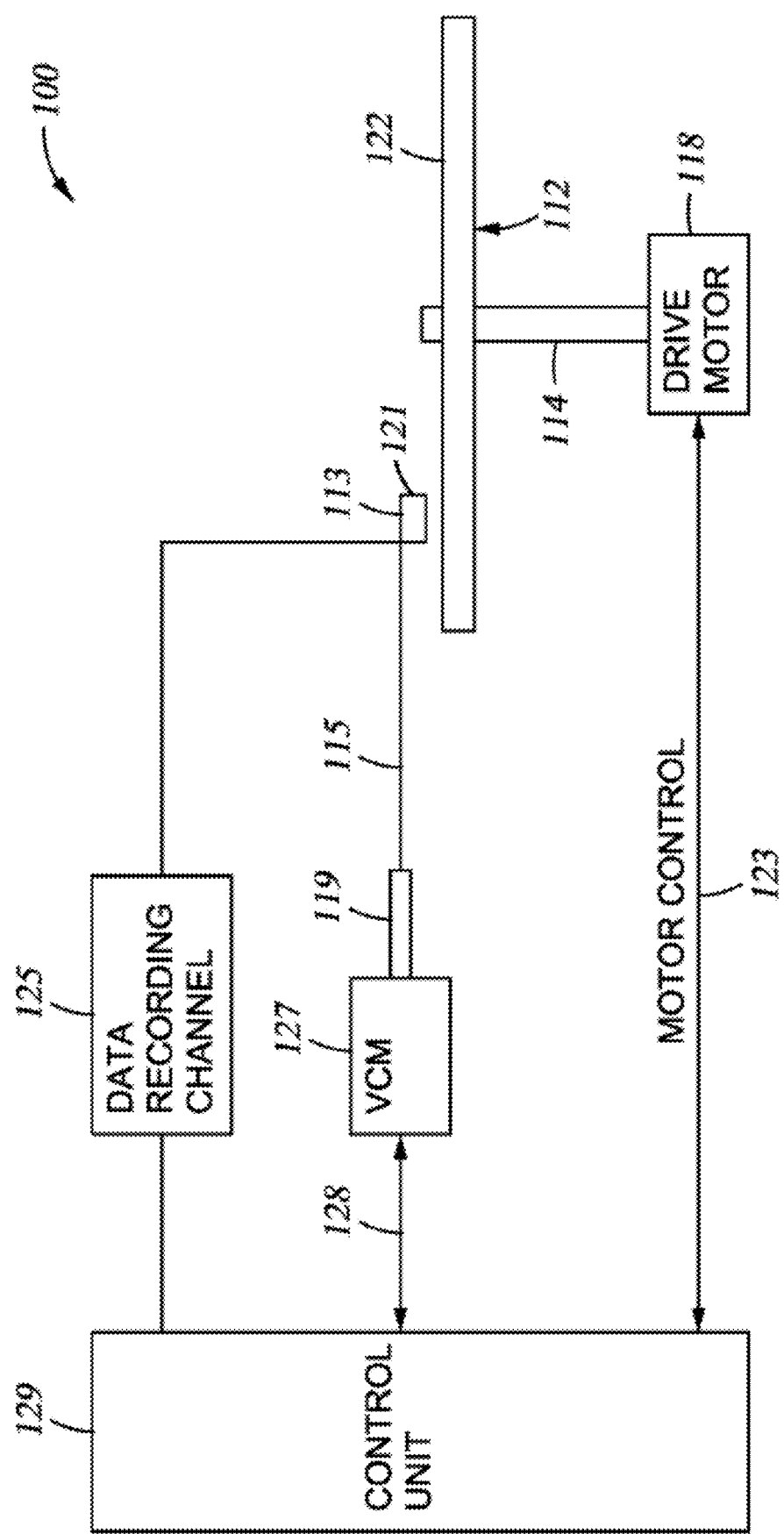
FIGS. 1A and 1B illustrate a disk drive system according to embodiments of the present disclosure.

As described above, the embodiments of the present disclosure are directed to a HAMR write head including a near-field transducer having enhanced thermal-mechanical stability and methods of manufacturing the same, the various aspects of which are described below in detail.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure. The same reference numerals refer to the same element or similar element. Unless otherwise indicated, elements having the same reference numerals are presumed to have the same composition. As used herein, a first element located "on" a second element can be located on the exterior side of a surface of the second element or on the interior side of the second element. As used herein, a first element is located "directly on" a second element if there exists a physical contact between a surface of the first element and a surface of the second element.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

FIG. 1A illustrates a disk drive 100 according to an embodiment of the present disclosure. As shown, at least one rotatable magnetic media 112 is supported on a spindle 114 and rotated by a disk drive motor 118. The magnetic recording on each media is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121 that may include a radiation source (e.g., a laser or LED) for heating the media surface 122. As the magnetic media 112 rotates, the slider 113 moves radially in and out over the media surface 122 so that the magnetic head assembly 121 may access different tracks of the magnetic media 112 to read or record data. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129.

During operation of a HAMR enabled disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 slightly above the media 112 surface by a small, substantially constant spacing during normal operation. The radiation source heats up the high-coercivity media so that the write elements of the magnetic head assembly 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of media and actuators, and each actuator may support a number of sliders.

Figure 1B:
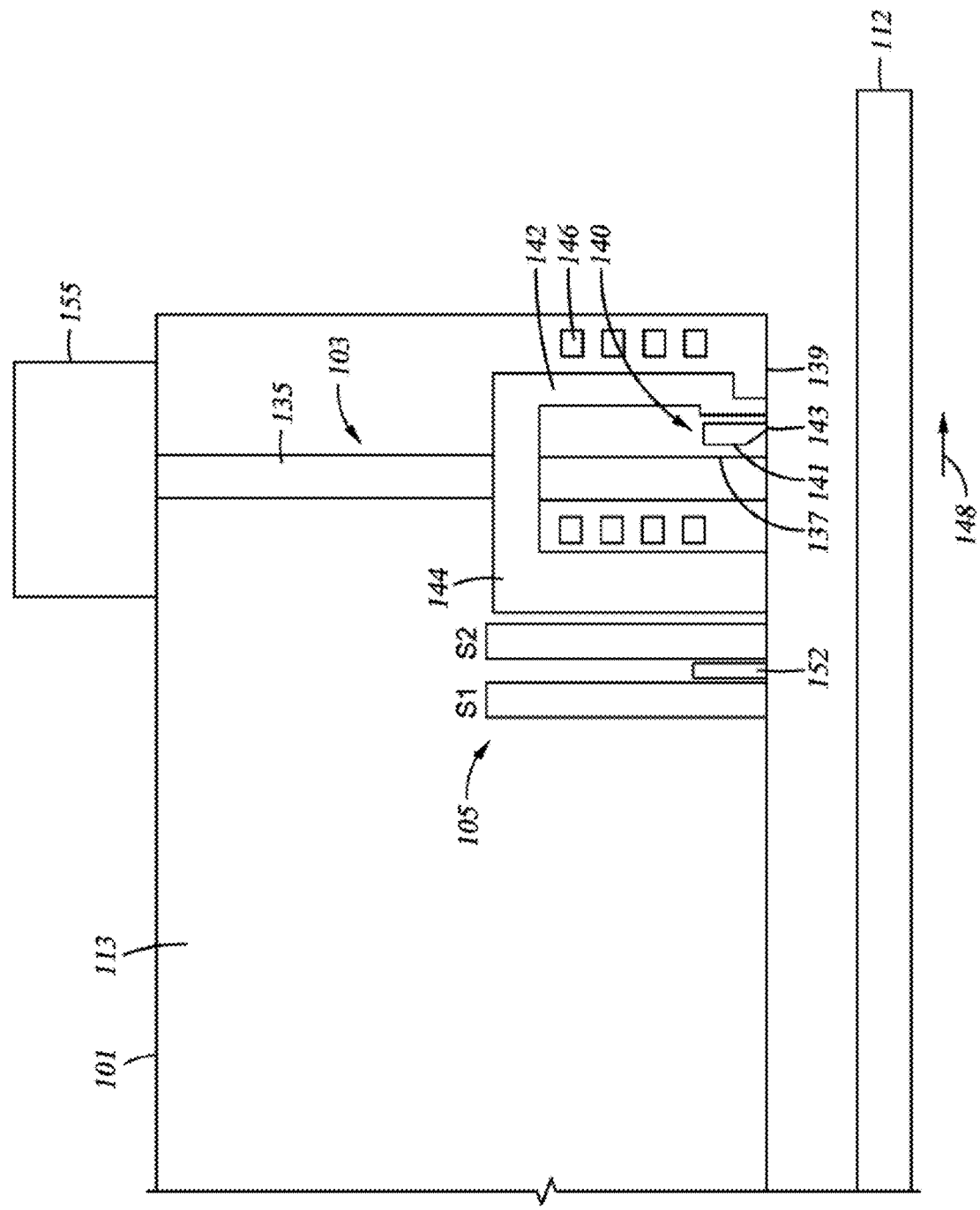

FIG. 1B is a fragmented, cross sectional side view of a HAMR read/write head 101 and magnetic media 112 of the disk drive 100 of FIG. 1A. The read/write head 101 may correspond to the magnetic head assembly 121 described in FIG. 1A. The read/write head 101 includes a media facing surface (MFS) 139, such as an air bearing surface (ABS) or a gas bearing surface (GBS), a write head 103 and a magnetic read head 105, and is mounted on the slider 113 such that the MFS 139 is facing the magnetic media 112. As shown in FIG. 1B, the magnetic media 112 moves past the write head 103 in the direction indicated by the arrow 148. As shown in FIG. 1B and subsequent figures, the X direction denotes an along-the-track direction, the Y direction denotes a track width or cross-track direction, and the Z direction denotes a direction substantially perpendicular to the MFS 139.

In some embodiments, the magnetic read head 105 is a magnetoresistive (MR) read head that includes an MR sensing element 152 located between MR shields S1 and S2. In other embodiments, the magnetic read head 105 is a magnetic tunnel junction (MTJ) read head that includes a MTJ sensing element 152 located between MR shields S1 and S2. The magnetic fields of the adjacent magnetized regions in the magnetic media 112 are detectable by the MR (or MTJ) sensing element 152 as the recorded bits.

The write head 103 includes a main pole 142, a waveguide 135, a NFT 140 disposed between the main pole 142 and the waveguide 135, a return pole 144, and a coil 146 that excites the main pole 142. A spot size converter (not shown) may be coupled to the NFT 140 and may be substantially parallel to the waveguide 135. The write head 103 may be operatively attached to a laser 155 (i.e., a radiation source). The laser 155 may be placed directly on the write head 103 or radiation may be delivered from the laser 155 located separate from the slider 113 through an optical fiber or waveguide. The waveguide 135 is a channel that transmits the radiation through the height of the write head 103 to the NFT 140 (e.g., a plasmonic device or optical transducer) which is located at or near the MFS 139. When radiation, such as a laser beam, is introduced into the waveguide 135, an evanescent wave is generated at a surface 137 of the waveguide 135 that couples to a surface plasmon excited on a surface 141 of the NFT 140. The surface plasmon propagates to a surface 143 of the NFT 140, and an optical near-field spot is generated near an apex (not shown) of the surface 143. In other embodiments, the waveguide 135 may not extend to the MFS 139, and the NFT 140 may be disposed at an end of the waveguide 135, so the NFT 140 is aligned with the waveguide 135. The embodiments herein, however, are not limited to any particular type of radiation source or technique for transferring the energy emitted from the radiation source to the MFS 139. The NFT 140 as shown in FIG. 1B is a nanobeak NFT. However, the NFT 140 is not limited to any particular type of NFT. In some embodiments, the NFT 140 is an e-antenna NFT or a lollipop NFT.

Figure 2A:
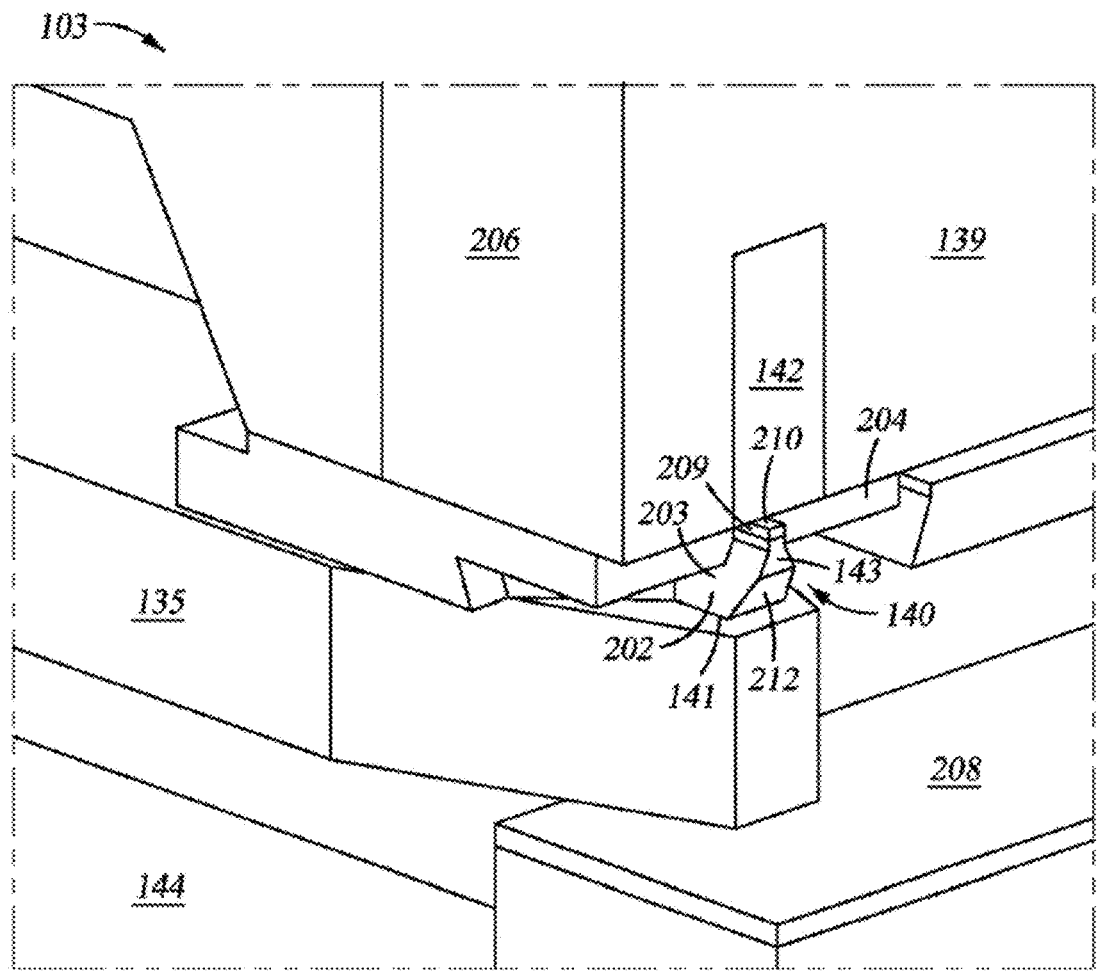
FIGS. 2A and 2B illustrate a heat assisted magnetic recording (HAMR) write head according to an embodiment of the present disclosure.

FIG. 2A is a fragmented perspective view of the HAMR write head 103, according to one embodiment described herein. To better illustrate certain components of the write head 103, a cladding material and a spacer layer are omitted. The write head 103 includes the return pole 144, the waveguide 135, the NFT 140, and the main pole 142. The NFT 140 may include an antenna 202. The write head 103 may further include a thermal shunt 204 coupled to the antenna 202, and the thermal shunt 204 may be disposed between the antenna 202 and the heat sink 206. The thermal shunt 204 may be made of a high-thermal-conductivity material. The write head 103 may further include a heat sink 206 surrounding the main pole 142 and a mirror layer 208 disposed on a surface of the return pole 144. The antenna 202 may include the surface 143 at the MFS 139, the surface 141 facing the waveguide 135, a surface 210 facing the main pole 142, and a surface 212 connecting the surface 143 and the surface 141.

The antenna 202 may also include a first portion 203 and a second portion 209. The second portion 209 may be a layer within the antenna 202 and may include the surface 210. The first portion 203 of the antenna 202 may be made of a metal, such as gold (Au), silver (Ag), copper (Cu) or aluminum (Al). The second portion 209 may be made of a material having a melting point that is greater than the melting point of the metal of the first portion 203, and the material of the second portion 209 may be immiscible in the material of the first portion 203. The second portion 209 may be made of an element or an alloy. In one embodiment, the second portion 209 is made of an element, such as Rh, Co, Ni, Pt, Pd, Ru, B, Mo, W, Ti, Ir, or Re. In other embodiments, the second portion 209 is made of an alloy. The alloy of the second portion 209 may include one or more metals, such as Rh, Co, Ni, Pt, Pd, Ru, B, Mo, W, Ti, Ir, Re, Au, Ag, Cu, or Al. In some embodiments, the alloy of the second portion 209 may include one or more metals and one or more alloying elements. The one or more metals of the alloy may be the same as the metal used for the first portion 203. Alternatively, the one or more metals of the alloy may include multiple metals. The one or more alloying elements may be any suitable material, such as Rh, Co, Ni, Pt, Pd, Ru, B, Mo, W, Ti, Ir, or Re. In some embodiments, the alloy is a gold alloy, such as AuRh, AuCo, or AuNi. In some embodiments, a ternary alloy is used to form the second portion 209, and the ternary alloy includes a metal alloyed with two alloying elements, or two metals with one alloying element, such as AgPdCu. In some embodiments, multiple metals are mixed with one or more alloying elements, such as AuAgCuIr or AuAgCuIrPd.

Figure 2B:
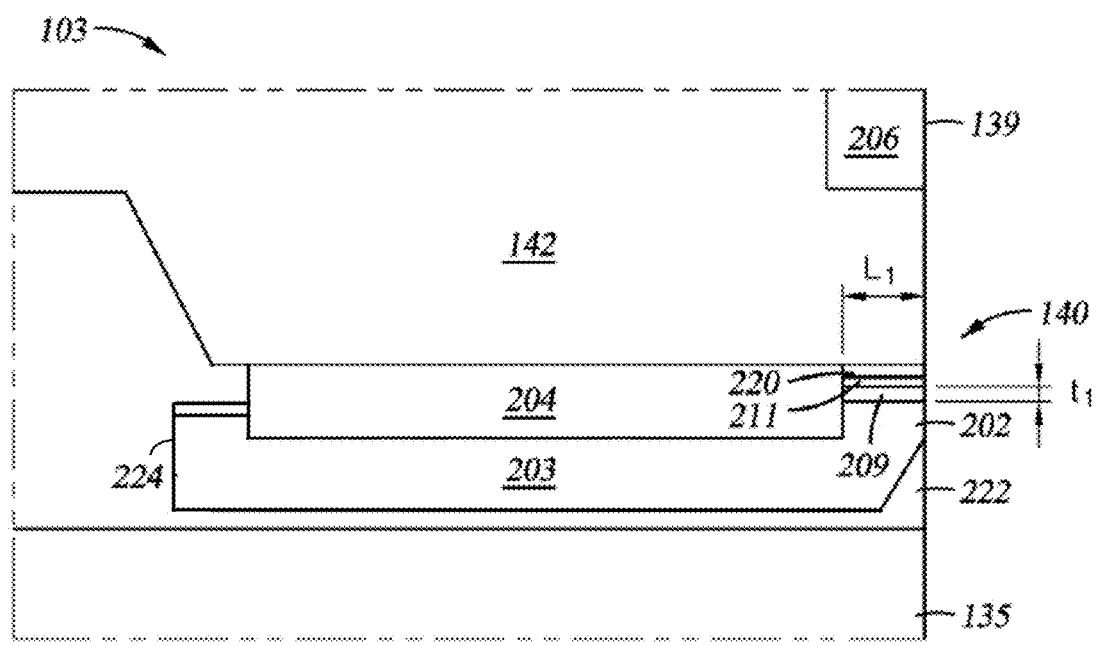

FIG. 2B is a fragmented cross-sectional view of the HAMR write head 103, according to one embodiment described herein. The write head 103 may include a cladding material 222 disposed between the waveguide 135 and the antenna 202, and the NFT 140 may include a spacer layer 220 disposed between the antenna 202 and the main pole 142. Both the cladding material 222 and the spacer layer 220 may be made of a dielectric material such as alumina, silicon oxide, silicon nitride, silicon oxynitride, or combinations thereof. The antenna 202 includes the first portion 203 and the second portion 209. An adhesion layer 211 may be disposed between the second portion 209 and the spacer layer 220, and the adhesion layer 211 may be made of any suitable material, such as Ta, Ti, Cr, Ni, Co, Hf, Zr, oxide of the materials mentioned thereof, or nitride of the materials mentioned thereof. The second portion 209 may have a length $L_1$ extending from the MFS 139 to a location away from the MFS 139. The length $L_1$ may be equal to or less than the distance between the thermal shunt 204 and the MFS 139. The length $L_1$ may range from about 30 nm to about 150 nm. When light is introduced into the antenna 202, charges in the antenna 202 are concentrated in the second portion 209 at the MFS 139, and large amount of heat is generated at MFS 139 in the second portion 209. If the second portion 209 extends to a back edge 224 of the antenna 202, heat flow to the heat sink 206 is reduced, and the temperature of the NFT 140 increases. Thus, by reducing the length $L_1$ of the second portion 209, the heat flow to the heat sink 206 is improved and the temperature of the NFT 140 is reduced.

The second portion 209 of the antenna 202 may have a thickness $t_1$ ranging from about 3 angstroms to about 50 nm. In one embodiment, the second portion 209 is made of an element, such as Rh, Co, Ni, Pt, Pd, Ru, B, Mo, W, Ti, Ir or Re, and the thickness $t_1$ of the second portion 209 is less than about 3 nm, such as from 3 to 5 angstroms. In another embodiment, the second portion 209 is made of an alloy as described above, and the thickness $t_1$ of the second portion 209 is less than 50 nm, such as about 3 to 5 nm.

Figure 3A:
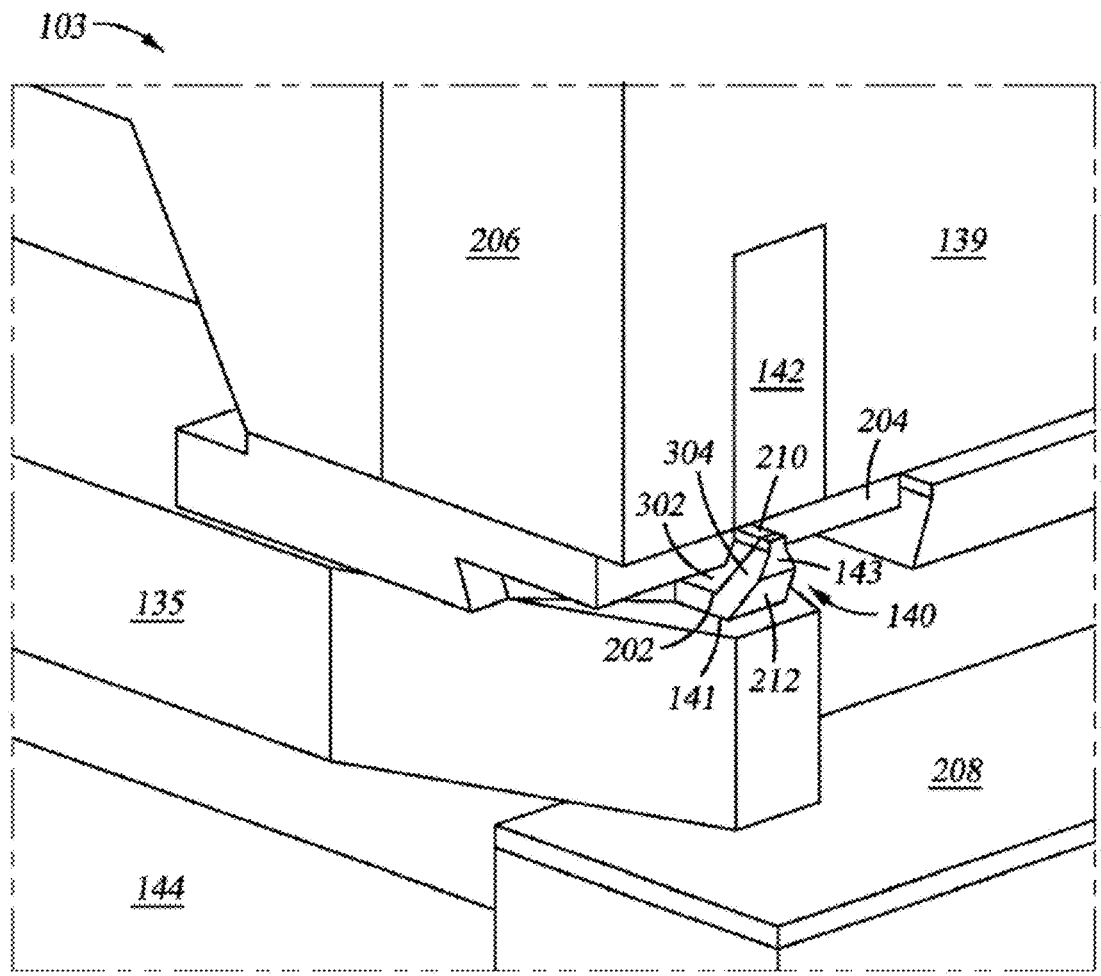
FIGS. 3A and 3B illustrate the HAMR write head according to an embodiment of the present disclosure.

FIG. 3A is a fragmented perspective view of the HAMR write head 103, according to one embodiment described herein. Again the cladding material and the spacer layer are omitted. The antenna 202 may include a first portion 302 and a second portion 304. The first portion 302 may be made of the same material as the first portion 203 (FIG. 2A), and the second portion 304 may be made of the same material as the second portion 209 (FIG. 2A). The second portion 304 may be a layer within the antenna 202 and may include a portion of the surface 210, the entire surface 143, the entire surface 212 and a portion of the surface 141.

Figure 3B:
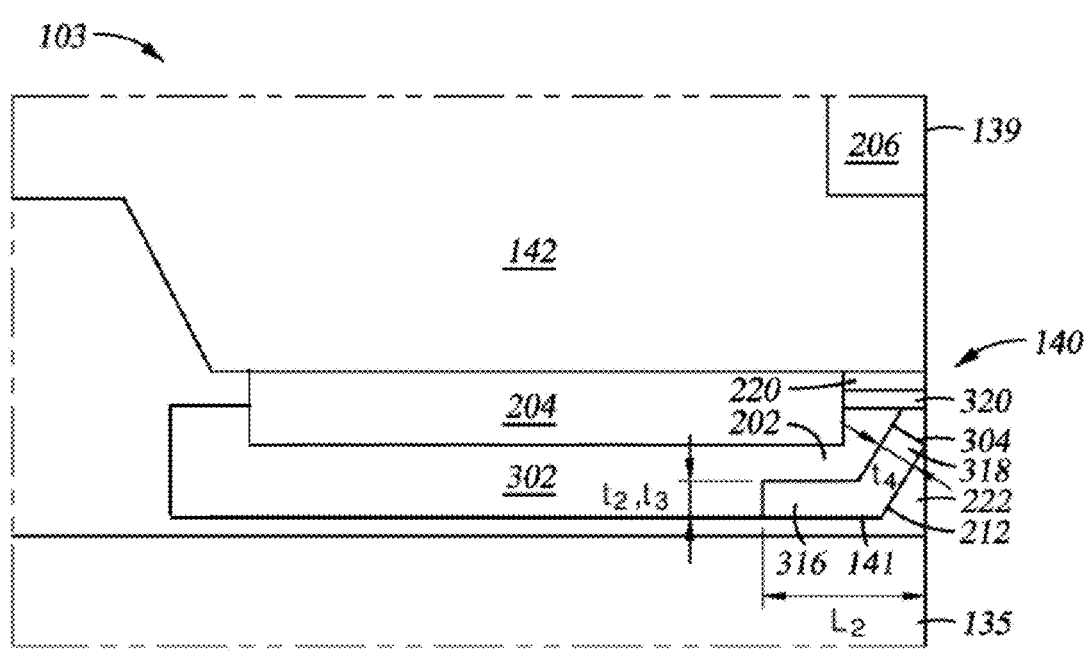

As shown in FIG. 3B, an adhesion layer 320 may be disposed between the antenna 202 and the spacer layer 220, and the adhesion layer 320 may be made of the same material as the adhesion layer 211. The second portion 304 of the antenna 202 may have a substantially uniform thickness $t_2$ that is less than about 100 nm, such as ranging from about 3 angstroms to about 50 nm. In one embodiment, the second portion 304 is made of an element, such as Rh, Co, Ni, Pt, Pd, Ru, B, Mo, W, Ti, Ir or Re, and the thickness $t_2$ of the second portion 304 is less than about 3 nm, such as 3 to 5 angstroms. In another embodiment, the second portion 304 is made of an alloy as described above, and the thickness $t_2$ of the second portion 304 is less than 50 nm. In some embodiments, the second portion 304 may have varying thicknesses. The second portion 304 may include a portion 316 that includes a portion of the surface 141, and the portion 316 of the second portion 304 has a thickness $t_3$. The second portion 304 may include a portion 318 that includes the surface 212, and the portion 318 of the second portion 304 has a thickness $t_4$. The thicknesses $t_3$ and $t_4$ may be different. The second portion 304 may have a length $L_2$ extending from the MFS 139 to a location away from the MFS 139. The length $L_2$ may range from about 50 nm to about 150 nm.

Figure 4A:
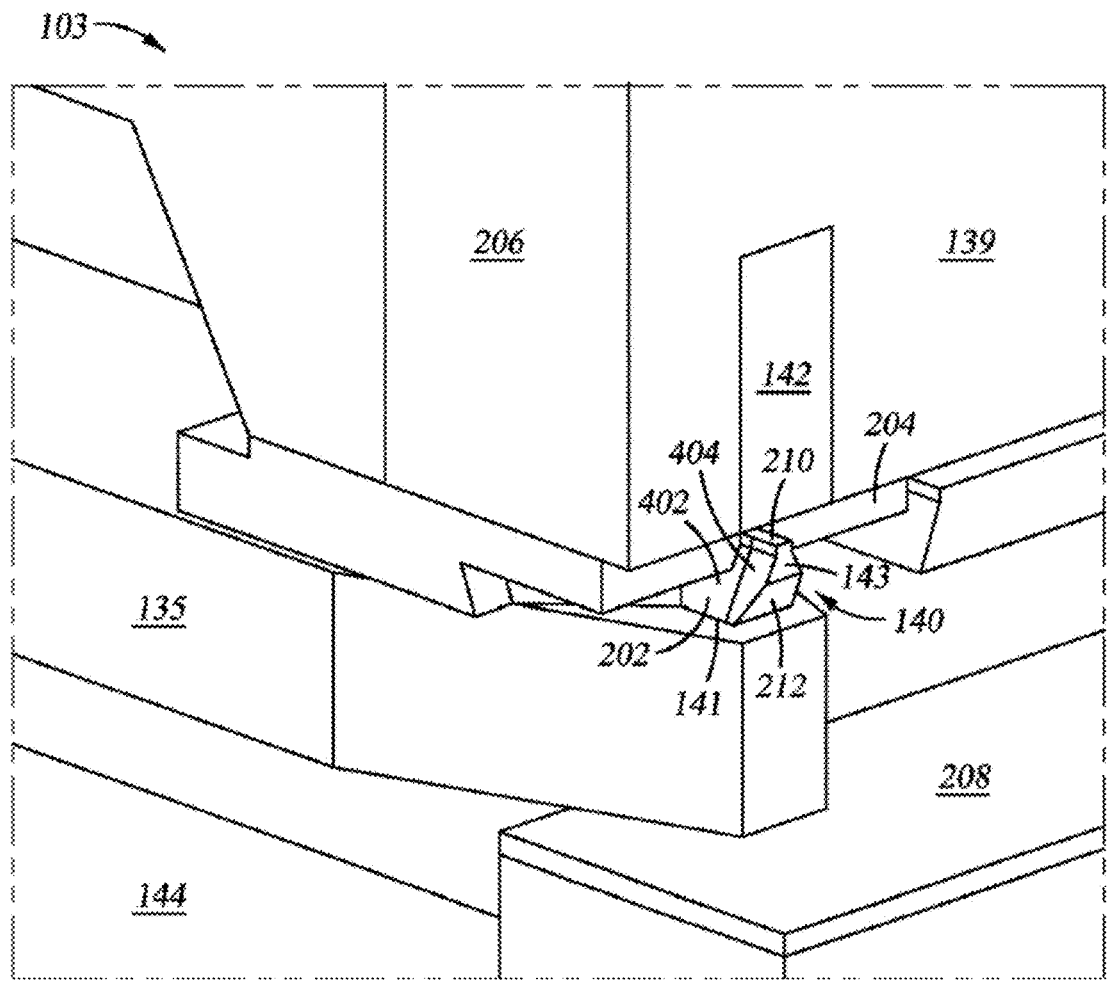
FIGS. 4A and 4B illustrate the HAMR write head according to an embodiment of the present disclosure.

FIG. 4A is a fragmented perspective view of the HAMR write head 103 according to one embodiment. The antenna 202 may include a first portion 402 and a second portion 404. The first portion 402 may be made of the same material as the first portion 203 (FIG. 2A), and the second portion 404 may be made of the same material as the second portion 209 (FIG. 2A). The second portion 404 may include a portion of the surface 210, the entire surface 143, the entire surface 212 and a portion of the surface 141.

Figure 4B:
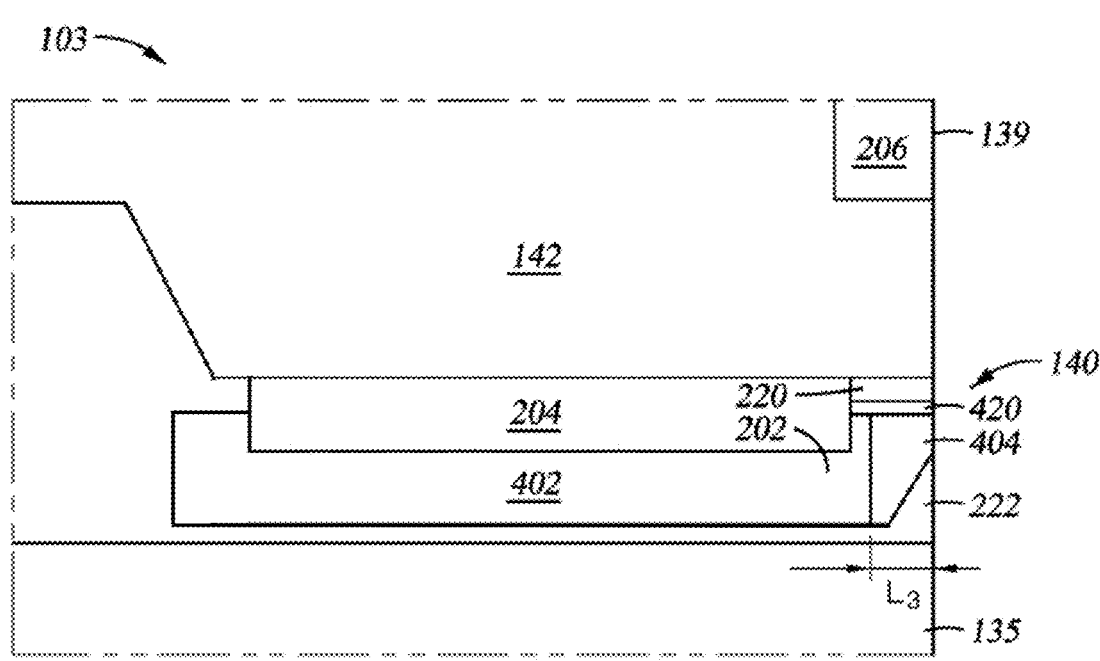

As shown in FIG. 4B, an adhesion layer 420 may be disposed between the antenna 202 and the spacer layer 220, and the adhesion layer 420 may be made of the same material as the adhesion layer 211. The second portion 404 of the antenna 202 may have a length $L_3$ extending from the MFS 139 to a location away from the MFS 139. The length $L_3$ may range from about 50 nm to about 150 nm.

FIG. 5A is a perspective view of a region around a near-field transducer 140 within the HAMR write heads 103 of FIGS. 2A, 2B or FIGS. 3A, 3B or FIGS. 4A, 4B according to an embodiment of the present disclosure. FIG. 5B is a top down cross-sectional view of the near-field transducer along plane B in FIG. 5A.

Generally, the nanoscale near field transducer (NFT) absorbs the optical energy delivered from a radiation beam (e.g., laser beam) through an optical waveguide and produces a strong localized electromagnetic field in a near field region. The localized electromagnetic filed is used to locally heat up the recording medium, thereby assisting a magnetic recording process.

A first comparative exemplary NFT has a nanobeak configuration, and includes an antenna 202 containing a first portion 203 comprising an 80 nm thick Au layer and a second portion 209 comprising a 20 nm thick Rh layer, similar to the NFT shown in FIGS. 2A and 2B. The combination of the Au layer and the Rh layer provides a balance between head reliability and areal density capability (ADC) performance. Although Au has excellent plasmonic/optical properties, the Au layer is susceptible to formation of voids and defects due to its insufficient thermo-mechanical stability at head operating temperatures.

In a second comparative exemplary NFT that is derived from the first comparative exemplary NFT, a homogenous Au alloy replaces the pure Au layer in the first portion 203 to improve the thermo-mechanical stability and consequently to improve the reliability and lifetime performance of a HAMR write head. The alloy element is typically selected from platinum group metals (PGM's), which include ruthenium, rhodium, palladium, osmium, iridium, and platinum. The alloy composition of an Au alloy layer may be controlled such that an atomic percentage of a PGM is in the range of 0.1% to 10% and is homogeneous throughout the first portion 203. However, it is still difficult to optimize Au alloy composition of Au alloy layer in the antenna 202 to improve the NFT thermo-mechanical stability without significantly penalizing the ADC performance. This is because there is a trade-off between plasmonic and thermal conductivity performance and thermo-mechanical stability of the Au alloy layer. For instance, a lower Au percentage in the Au alloy composition improves thermo-mechanical stability (structural characteristics) but degrades optical/plasmonic performance and thermal conductivity, and a higher Au percentage in the Au alloy composition improves optical/plasmonic performance and thermal conductivity but degrades thermo-mechanical stability (structural characteristics).

According to an aspect of the present disclosure, an antenna 202 comprises a laminated Au alloy structure with graded Au alloy compositions in lieu of a single Au layer or a single Au alloy layer. The component layers in the laminated Au alloy structure have a respective gold-based material composition such that laminated Au alloy structure provides enhanced thermo-mechanical stability (leading to longer head lifetime performance) with no or little penalty on the ADC performance. The laminated Au alloy structure with graded Au alloy compositions therein may be employed as the first portion 203 of the NFT either in combination with or without the additional PGM portion (e.g., a second portion 209) of the antenna 202 to improve the optical/plasmonic performance while keeping robust thermo-mechanical stability.

Generally, the laminated Au alloy structure with graded Au alloy compositions can be fabricated employing an in-situ co-sputtering processes of Au and Au alloy targets (or a sputtering process employing Au and alloy element (e.g., PGM metal element) targets) without breaking vacuum. Thus, the sputtering apparatus may include a pure gold first sputtering target and a gold-PGM alloy second sputtering target, such as a Au—Rh, Au—Ir, Au—Pd or Au—Pt alloy sputtering target. Alternatively, or in addition the sputtering apparatus may include a pure PGM metal sputtering target, such as a Rh, Ir, Pd or Pt sputtering target instead of or in addition to the gold-PGM alloy target.

The alloy composition of each sputtered layer can be controlled by tuning the sputter powers of the targets. The alloy element (M) is selected from the platinum group metals which include Rh, Pd, Ir, Pt, Ru and/or Os. In one embodiment, the component layers within the laminated Au alloy structure may have a respective material composition of $Au_{1-x}M_x$, in which M is a platinum group metal (PGM) such as Rh, Ir, Pd, and/or Pt, and the value of x is in a range from 0 to 0.1, including 0.001 to 0.005, where x is greater than 0 in at least two of the gold-based alloy component layers. According to an aspect of the present disclosure, the value of x may be different for each component layer, and at least two component layers have a different, non-zero value of x. While it is possible to deposit two gold-based layers having a same material composition with a pause during a deposition process, a combination of such two gold-based layers is indistinguishable from a single gold-based layer. As such, if two gold-based layers having the same material composition are formed without any intermediate material layer therebetween, such a combination of two gold-based layers is considered to be a single gold-based layer. The number of the component layers within the laminated Au alloy structure may be from 2 to 20 layers, such as from 3 to 12 layers, and the thickness of each component layer may be in a range from 2 nm to 50 nm, such as from 4 nm to 30 nm.

FIGS. 6A-6F are sequential cross-sectional views of an exemplary structure that is employed to form a near-field transducer containing an antenna and a thermal shunt during a manufacture process along a cross-sectional plane X1 in FIG. 5A.

Figure 6A:
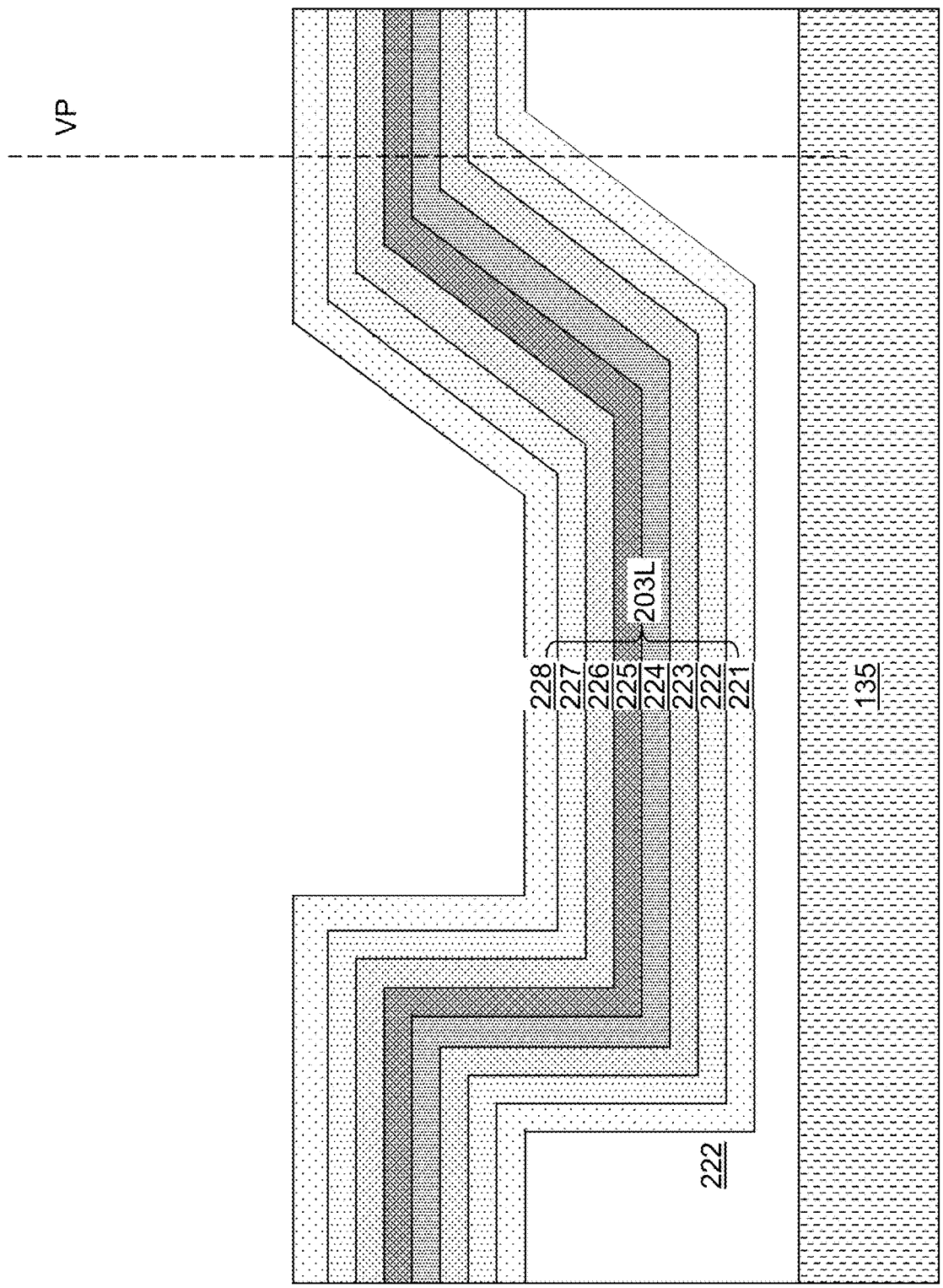
FIGS. 6A-6F are sequential cross-sectional views of an exemplary structure that is employed to form a near-field transducer containing an antenna and a thermal shunt during a manufacture process along a cross-sectional plane X1 in FIG. 5A.

Referring to FIG. 6A, a waveguide 135 may be formed over a substrate (not illustrated). The waveguide may comprise a metal oxide layer, such as tantalum pentoxide or other suitable materials. A first dielectric matrix layer 222 (such as a silicon oxide layer) may be formed above the waveguide 135. A recess cavity may be formed in an upper portion of the first dielectric matrix layer 222 such that the recess cavity has a basin portion and a shallow wing portion. Further, the recess cavity may have a tapered surface as illustrated in FIG. 6A such that an air bearing surface (ABS) to be subsequently formed along a vertical plane VP intersects the tapered surface.

The recess cavity can be filled with a gold-based layer stack 203L, which can include N gold-based layers (e.g., layers having at least 50 atomic percent gold, such as 55 to 100 atomic percent gold). In the illustrative example, the gold-based layer stack 203L comprises 8 gold-based layers. The component layers within the gold-based layer stack 203L may be labeled with a positive integer index i that begins with 1 and runs up to N. In the illustrative example, each i-th gold-based component layer within the gold-based layer stack 203L is referred to as an i-th gold-based component layer 22i, in which the index i runs from 1 to N. For example, if N=8, then there are eight gold-based component layers 221, 222, 223, 224, 225, 226, 227, and 228. The total thickness of the gold-based layer stack 203L is selected such that the entire volume of the recess cavity is filled with the gold-based layer stack 203L.

According to an aspect of the present disclosure, the gold-based layer stack 203L comprises a layer stack of three or more gold-based component layers (221, 222, 223, 224, 225, 226, 227, 228). In one embodiment, the layer stack of three or more gold-based component layers (221, 222, 223, 224, 225, 226, 227, 228) contains a waveguide-side outermost gold-based component layer (such as the first gold-based component layer 221), a pole-side outermost gold-based component layer (such as the last (i.e., topmost) gold-based component layer 228), and one or more intermediate gold-based component layers (222, 223, 224, 225, 226, 227). According to an embodiment of the present disclosure, an intermediate gold-based component layer (222, 223, 224, 225, 226, or 227) of the one or more intermediate gold-based component layers (222, 223, 224, 225, 226, 227) includes at least one platinum group metal (PGM) at a maximum total atomic percentage that is greater than a total atomic percentage of the at least one PGM in the waveguide-side outermost gold-based component layer 221, and is greater than a total atomic percentage of the at least one PGM in the pole-side outermost gold-based component layer 228. In one embodiment, the maximum total atomic percentage of the at least one PGM in the intermediate gold-based component layer (223, 224, 225, or 226) is in a range from 0.2% to 0.5%. As used herein the term "maximum" means the highest value of the total atomic percentage of the PGM in the first portion of the antenna 202 rather than a maximum permitted atomic percentage.

In one embodiment, the one or more intermediate gold-based component layers (222, 223, 224, 225, 226, 227) may comprise: a waveguide-side PGM-containing gold-based component layer (222, 223, 224, or 225) that is more proximal to the waveguide 135 than the intermediate gold-based component layer (223, 224, 225, or 226) is to the waveguide 135; and a pole-side PGM-containing gold-based component layer (224, 225, 226, or 227) that is more proximal to the main pole 142 than the intermediate gold-based component layer (223, 224, 225, or 226) is to the main pole 142. Each of the waveguide-side PGM-containing gold-based component layer (222, 223, 224, or 225) and the pole-side PGM-containing gold-based component layer (224, 225, 226, or 227) comprises the at least one PGM at a lower atomic percentage than the maximum total atomic percentage.

In one embodiment, the waveguide-side outermost gold-based component layer 221 is in direct contact with the at least one dielectric matrix layer (220, 222). In one embodiment, the waveguide-side outermost gold-based component layer 221 is free of the at least one PGM (i.e., is a pure Au layer containing only unavoidable impurities and no intentionally added PGM elements). In one embodiment, the pole-side outermost gold-based component layer 228 is free of the at least one PGM (i.e., is a pure Au layer).

Figure 6B:
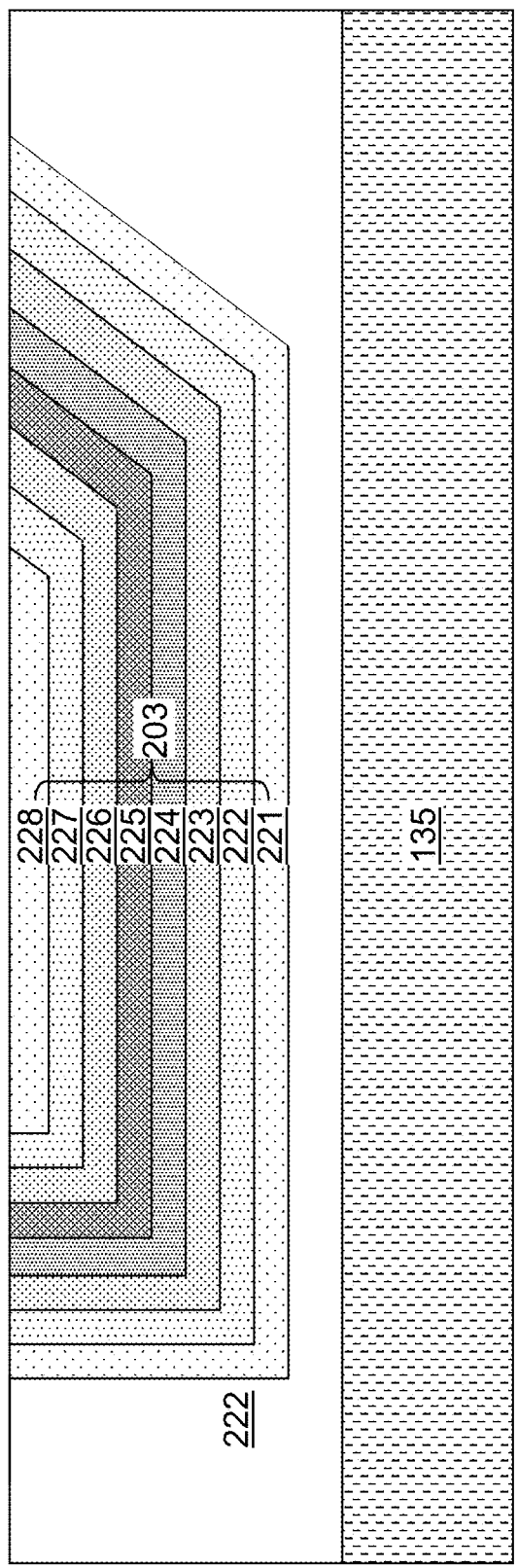

Referring to FIG. 6B, the portions of the gold-based layer stack 203L that overlies a top surface of the first dielectric matrix layer 222 can be removed by performing a planarization process. In one embodiment, a chemical mechanical polishing (CMP) process may be performed to remove portions of the gold-based layer stack 203L from above the horizontal plane including the top surface of the first dielectric matrix layer 222. The remaining portion of the gold-based layer stack 203 constitutes a first portion 203 of the antenna 202 to be subsequently formed.

Figure 6C:
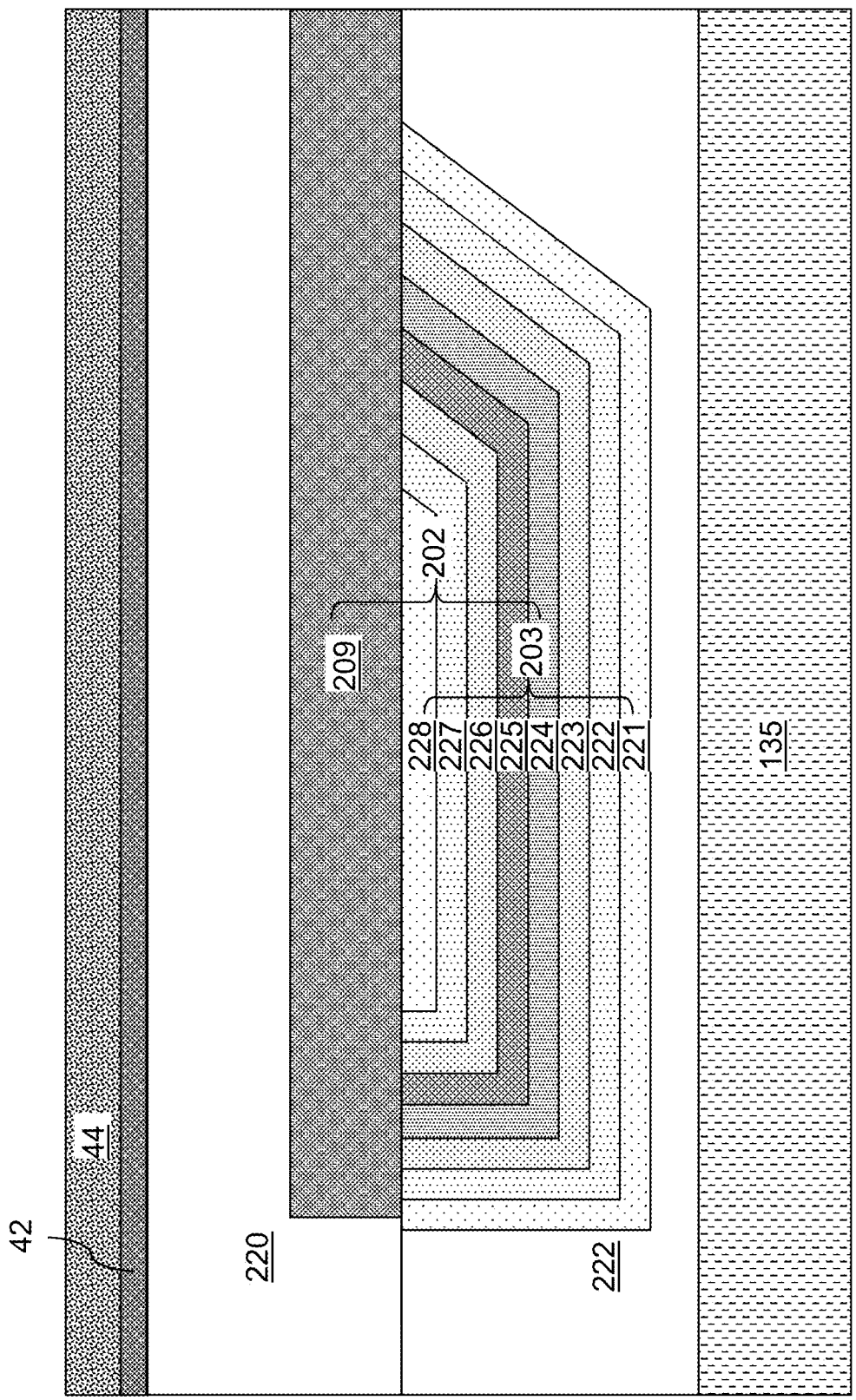

Referring to FIG. 6C, a metal layer can be deposited over the first portion 203 of the antenna 202, and can be subsequently patterned to form the optional second portion 209 of the antenna 202. Thus, in one embodiment, the antenna 202 comprises the first portion 203 and the second portion 209. The metallic material of the second portion 209 has a higher melting point than gold. In one embodiment, the metallic material of the second portion 209 of the antenna 202 comprises, and/or consists essentially of, at least one material that is selected from Rh, Co, Ni, Pt, Pd, Ru, B, Mo, Nb, Ta, W, Ti, Os, Ir, or Re. In one embodiment, the metallic material of the second portion 209 of the antenna may be free of gold. The various gold-based component layer 22*i* (0<i<(N+1)) may be in direct contact with the second portion 209 of the antenna 202. Alternatively, the second portion 209 of the antenna 202 may be omitted.

In one embodiment, the antenna 202 comprises a first portion that includes a remaining portion of the gold-based layer stack 203L after the planarization process, and a second portion 209 that is formed by deposition and patterning of a metallic material selected from Rh, Co, Ni, Pt, Pd, Ru, B, Mo, Nb, Ta, W, Ti, Os, Ir, or Re over the first portion of the antenna 202. For example, the second portion 209 may comprise a Rh layer. A second dielectric matrix layer 220 can be formed over the second portion 209 (if present) of the antenna 202. Generally, at least one dielectric matrix layer (222, 220) can be formed around the antenna 202. The top surface of the second dielectric matrix layer 220 may be planarized, for example, by a chemical mechanical polishing process.

A metallic adhesion layer 42 can be deposited over the second dielectric matrix layer 220. In one embodiment, the metallic adhesion layer 42 comprises, and/or consists essentially of a metal or metal alloy, such as Ta, Ti, Cr, Ni, Co, Hf, Zr, oxide of the materials mentioned above, or nitride of the materials mentioned above.

An etch mask layer 44 can be formed over the metallic adhesion layer 42. The etch mask layer 44 comprises an etch mask material that can protect the metallic adhesion layer 42 and bottom layers during a subsequent ion milling process. In one embodiment, the etch mask layer 44 comprises a carbon material, such as amorphous carbon or diamond-like carbon (DLC).

Figure 6D:
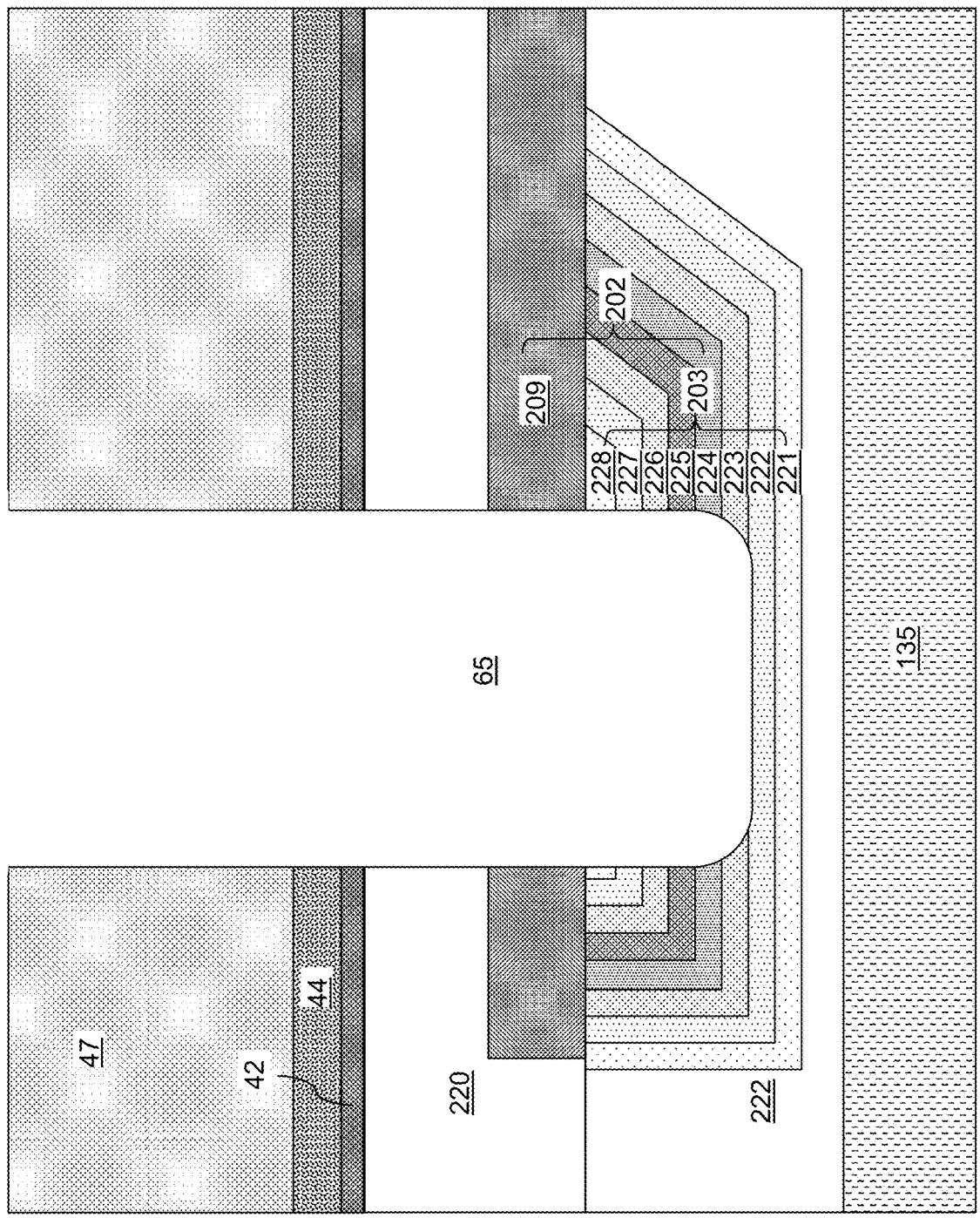

Referring to FIG. 6D, a masking layer, such as a photoresist layer 47 may be applied over the etch mask layer 44, and can be lithographically patterned to form an opening in an area that overlies the antenna 202 outside the area of the tapered surface of the first portion 203 of the antenna 202, i.e., in an area in which each gold-based component layer 22*i* of the gold-based layer stack is present. An anisotropic etch process or an ion milling process may be performed to transfer the pattern of the opening in the photoresist layer 47 through the etch mask layer 44, the metallic adhesion layer 42, the second dielectric matrix layer 220, and the second portion 209 of the antenna 202, and partly into the first portion 203 of the antenna 202. According to an aspect of the present disclosure, the anisotropic etch process or the ion milling process may terminate before etching the waveguide-side outermost gold-based component layer 221 (such as the first gold-based component layer 221), and preferably before etching the second gold-based component layer 222. A via cavity 65 is formed in the volume from which the materials of the second dielectric matrix layer 220, the second portion 209 of the antenna 202, and the first portion 203 of the antenna 202 are removed. The sidewalls of the via cavity 65 may be vertical or substantially vertical. A sidewall of the intermediate gold-based component layer (223, 224,

225, or 226) having the highest (i.e., "maximum") atomic percentage of the at least one PGM may be physically exposed in the via cavity 65. The photoresist layer 47 and the etch mask layer 44 can be subsequently removed, for example, by stripping in a solvent or by ashing.

Figure 6E:
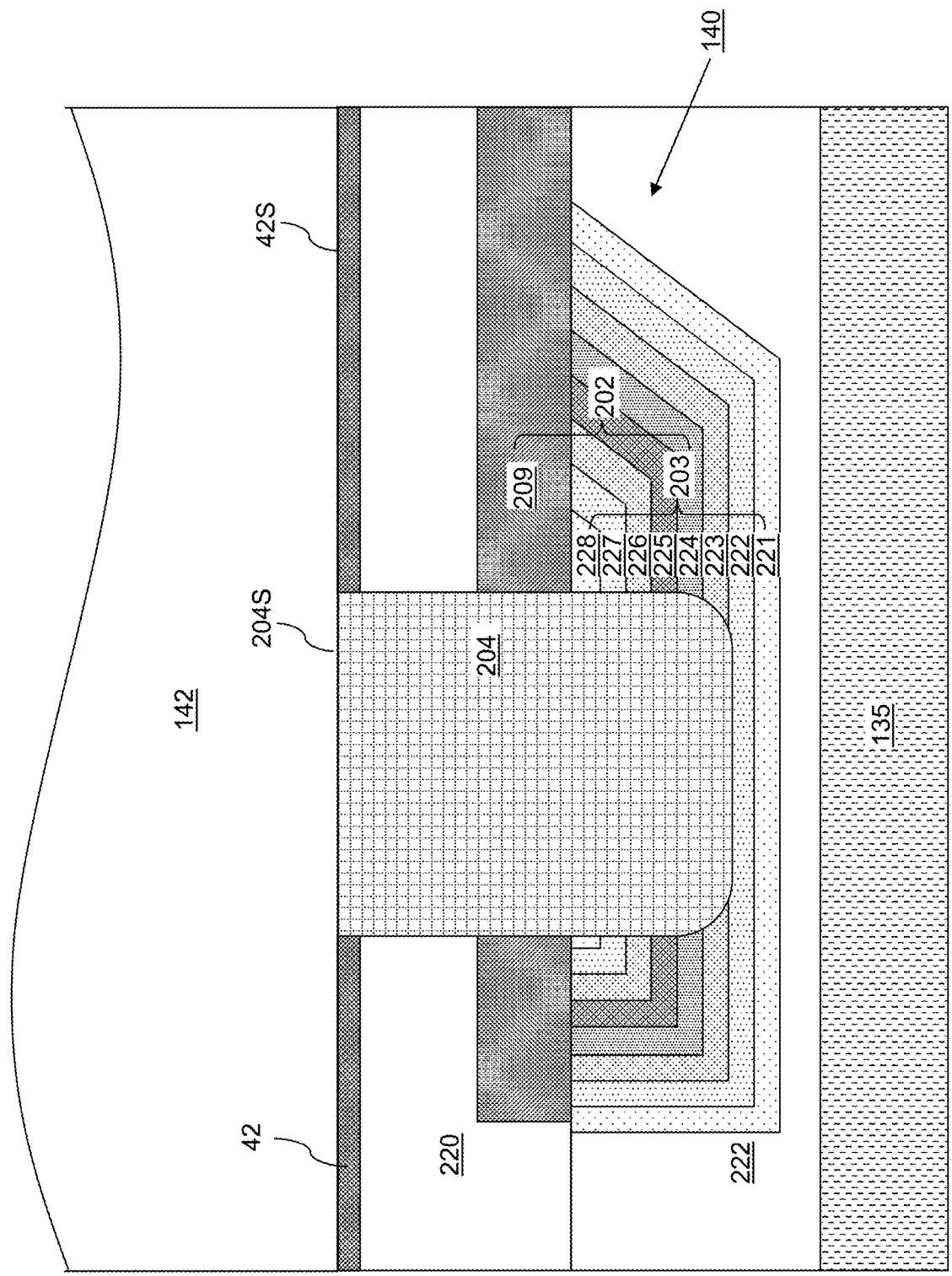

Referring to FIG. 6E, an in-process near-field transducer 140 of the HAMR write head 103 is illustrated after formation of a thermal shunt 204 and a main pole 142. For example, an optional metallic shunt diffusion barrier liner including at least one metal selected from Rh, Co, Ni, Pt, Pd, Ru, B, Mo, Nb, Ta, W, Ti, Os, Ir, and/or Re can be formed on vertical sidewalls of the via cavity 65. A high-thermal-conductivity metal can deposited in the remaining portion of the via cavity 65 by a conformal or non-conformal deposition process. The high-thermal-conductivity metal may be any metal that provide high thermal conductivity such as Au, Ag, Cu, or Al.

Excess portions of the high-thermal-conductivity metal and the metallic shunt diffusion barrier liner may be removed from above the horizontal plane including the top surface of the metallic adhesion layer 42 by performing a planarization process, such as a chemical mechanical polishing process. Any remaining portion of the etch mask layer 44, if present, may be collaterally removed during the planarization process. Remaining portions of the high-thermal-conductivity metal and the metallic shunt diffusion barrier liner that fill the via cavity 65 constitute the thermal shunt 204. A top surface 204S of the thermal shunt 204 may be coplanar with a top surface 42S of the metallic adhesion layer 42.

Generally, the near-field transducer 140 may comprise a thermal shunt 204 that is embedded in the at least one dielectric matrix layer (220, 222) and is in direct contact with the antenna 202. The thermal shunt 204 can be formed through the second dielectric matrix layer 220 and into the antenna 202. The thermal shunt 204 can be in direct contact with the pole-side outermost gold-based component layer 228 and the intermediate gold-based component layer (223, 224, 225, or 226). In one embodiment, the pole-side outermost gold-based component layer 228 and the intermediate gold-based component layer (223, 224, 225, or 226) are in direct contact with the second portion 209 of the antenna 202, and are in direct contact with the thermal shunt 204. In one embodiment, the waveguide-side outermost gold-based component layer 221 is not in direct contact with the thermal shunt 204. In one embodiment, the at least one dielectric matrix layer (220, 222) comprises a first dielectric matrix layer 222 embedding the antenna 202, and a second dielectric matrix layer 220 embedding, and in direct contact with, the thermal shunt 204, Subsequently, the main pole 142 and additional structures overlying the near-field transducer 140 as described in FIGS. 2A, 2B, 3A, 3B, 4A, and 4B may be formed.

Figure 6F:
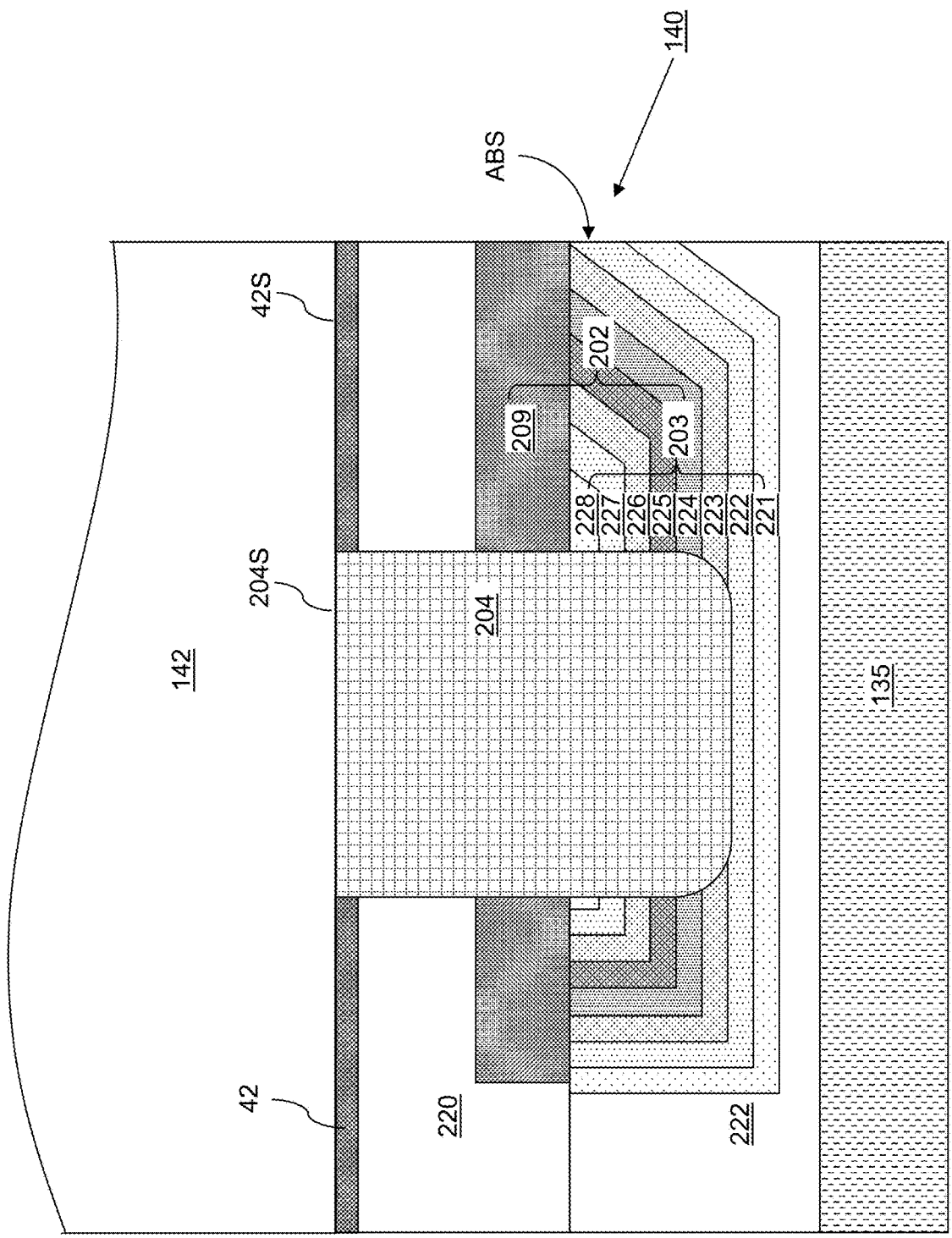

Referring to FIG. 6F, the main pole 142, the second dielectric matrix layer 220, the antenna 202, and the first dielectric matrix layer 222 can be polished to provide an air bearing surface (ABS). A polished surface segment of the waveguide-side outermost gold-based component layer 221 can be a portion of the air bearing surface. In other words, a surface segment of the waveguide-side outermost gold-based component layer 221 is a portion of an air bearing surface of the HAMR write head 103.

Figure 7:
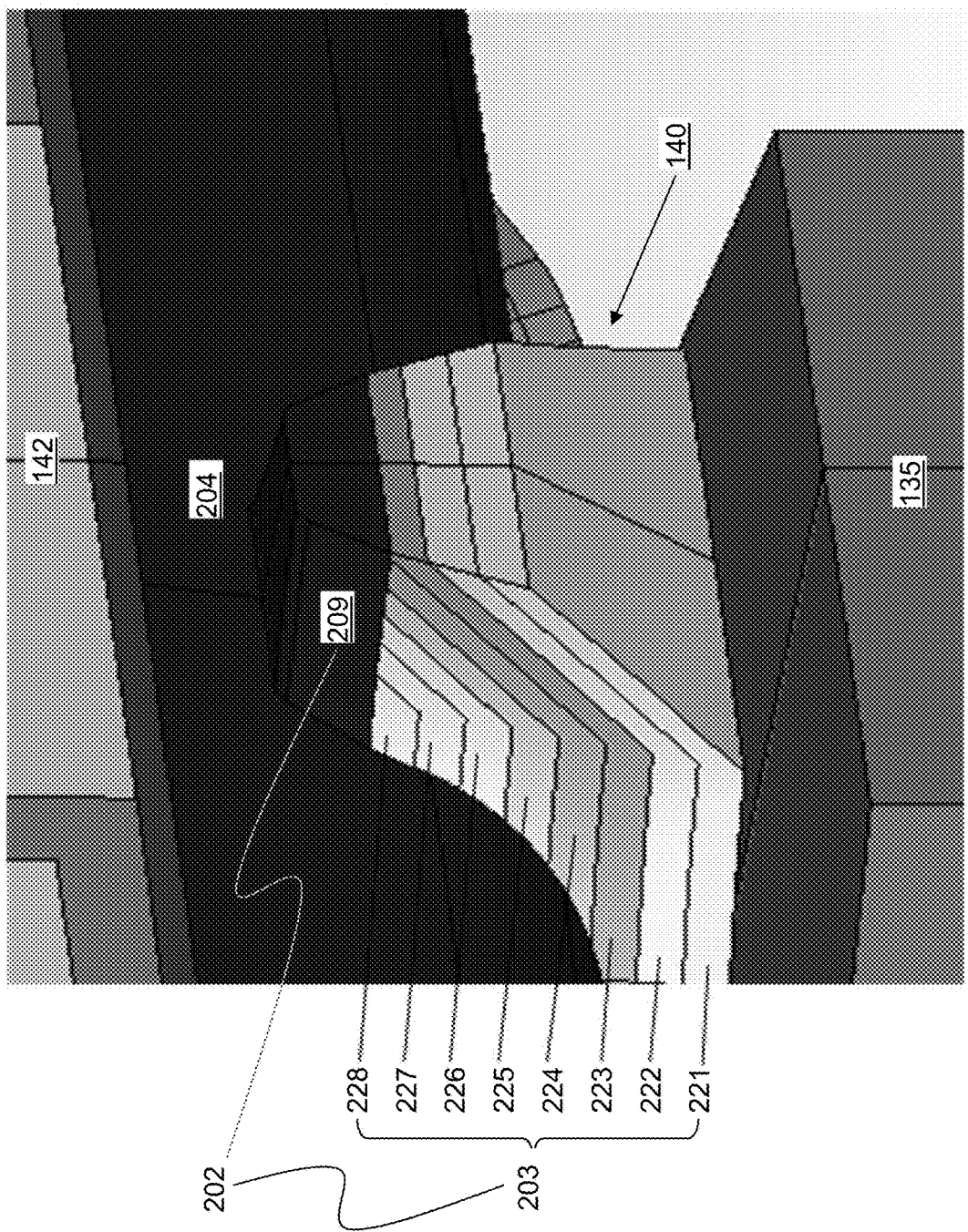
FIG. 7 is a partial see-through perspective view of the near field transducer according to an embodiment of the present disclosure.

Referring to FIG. 7, a partial see-through perspective view of the near field transducer according to an embodiment of the present disclosure is illustrated.

Referring collectively to FIGS. 6F and 7 and according to various embodiments of the present disclosure, a heat assisted magnetic recording (HAMR) write head 103 is provided, which comprises: a main pole 142; a waveguide 135; at least one dielectric matrix layer (220, 222); and a near-field transducer 140 disposed between the waveguide 135 and the main pole 142, wherein: the near-field transducer 140 is embedded in the at least one dielectric matrix layer (220, 222) and comprises an antenna 202; a first portion of the antenna 202 includes a layer stack of three or more gold-based component layers (221, 222, 223, 224, 225, 226, 227, 228) that contain a waveguide-side outermost gold-based component layer 221, a pole-side outermost gold-based component layer 228, and one or more intermediate gold-based component layers (222, 223, 224, 225, 226, 227); and an intermediate gold-based component layer (222, 223, 224, 225, 226, or 227) among the one or more intermediate gold-based component layers (222, 223, 224, 225, 226, 227) includes at least one platinum group metal (PGM) at a maximum total atomic percentage that is greater than a total atomic percentage of the at least one PGM in the waveguide-side outermost gold-based component layer 221 and is greater than a total atomic percentage of the at least one PGM in the pole-side outermost gold-based component layer 228.

According to another aspect of the present disclosure, a hard disk drive is provided, which comprises: the HAMR write head 103 of embodiments of the present disclosure; a magnetic read head 105; and a magnetic media 112.

The following non-limiting examples compare performance of the near field transducers 140 of the embodiments of present disclosure with performance of comparative exemplary near field transducers described above. Five exemplary near field transducers of the embodiments of the present disclosure include a respective gold-based layer stack 203 including a respective set of 8 gold-based component layers $22i$ ($0<i<9$) each having a thickness of 10 nm (for a total thickness of 80 nm), and a second portion 209 consisting essentially of Rh and having a thickness of 20 nm. Table 1 below summarizes the compositions of the various Exemplary Samples (i.e., including gold-based component layers in the five exemplary NFTs of the embodiments of the present disclosure), which are labeled Sample A, Sample B, Sample C, Sample D, and Sample E, respectively. In addition, the Control Sample includes the antenna of the first comparative NFT that contains an 80 nm thick gold layer for the first portion 203 and a 20 nm thick Rh layer for the second portion 209. Further, two second comparative NFT samples include Second Comparative Samples AuRh0.1 and AuRh0.2. Sample AuRh0.1 includes an antenna 202 that contains an 80 nm thick $Au_{0.9988}Rh_{0.0012}$ homogenous alloy layer for the first portion 203 and a 20 nm thick Rh layer for the second portion 208. Sample AuRh0.2 includes an antenna 202 that contains an 80 nm thick $Au_{0.9981}Rh_{0.0019}$ homogenous alloy layer for a first portion 203 and a 20 nm thick Rh layer for the second portion 209.

TABLE 1

Component layer compositions of the comparative exemplary Samples A, B, C, D, and E

| Sample ID | A | B | C | D | E |
|---|---|---|---|---|---|
| Layer 221 composition | Au | Au | Au | Au | Au |
| Layer 222 composition | $Au_{0.9988}Rh_{0.0012}$ | $Au_{0.9981}Rh_{0.0019}$ | $Au_{0.9971}Rh_{0.0029}$ | $Au_{0.9964}Rh_{0.0036}$ | $Au_{0.9988}Rh_{0.0012}$ |
| Layer 223 composition | $Au_{0.9964}Rh_{0.0036}$ | $Au_{0.9964}Rh_{0.0036}$ | $Au_{0.9964}Rh_{0.0036}$ | $Au_{0.9964}Rh_{0.0036}$ | $Au_{0.9981}Rh_{0.0019}$ |
| Layer 224 composition | $Au_{0.9971}Rh_{0.0029}$ | $Au_{0.9971}Rh_{0.0029}$ | $Au_{0.9971}Rh_{0.0029}$ | $Au_{0.9971}Rh_{0.0029}$ | $Au_{0.9971}Rh_{0.0029}$ |
| Layer 225 composition | $Au_{0.9981}Rh_{0.0019}$ | $Au_{0.9981}Rh_{0.0019}$ | $Au_{0.9981}Rh_{0.0019}$ | $Au_{0.9981}Rh_{0.0019}$ | $Au_{0.9964}Rh_{0.0036}$ |
| Layer 226 composition | $Au_{0.9988}Rh_{0.0012}$ | $Au_{0.9988}Rh_{0.0012}$ | $Au_{0.9988}Rh_{0.0012}$ | $Au_{0.9988}Rh_{0.0012}$ | $Au_{0.9971}Rh_{0.0029}$ |
| Layer 227 composition | Au | Au | Au | Au | $Au_{0.9981}Rh_{0.0019}$ |
| Layer 228 composition | Au | Au | Au | Au | $Au_{0.9988}Rh_{0.0012}$ |
| Average composition | $Au_{0.9987}Rh_{0.0013}$ | $Au_{0.9986}Rh_{0.0014}$ | $Au_{0.9985}Rh_{0.0015}$ | $Au_{0.9984}Rh_{0.0016}$ | $Au_{0.9981}Rh_{0.0019}$ |

Figure 8:
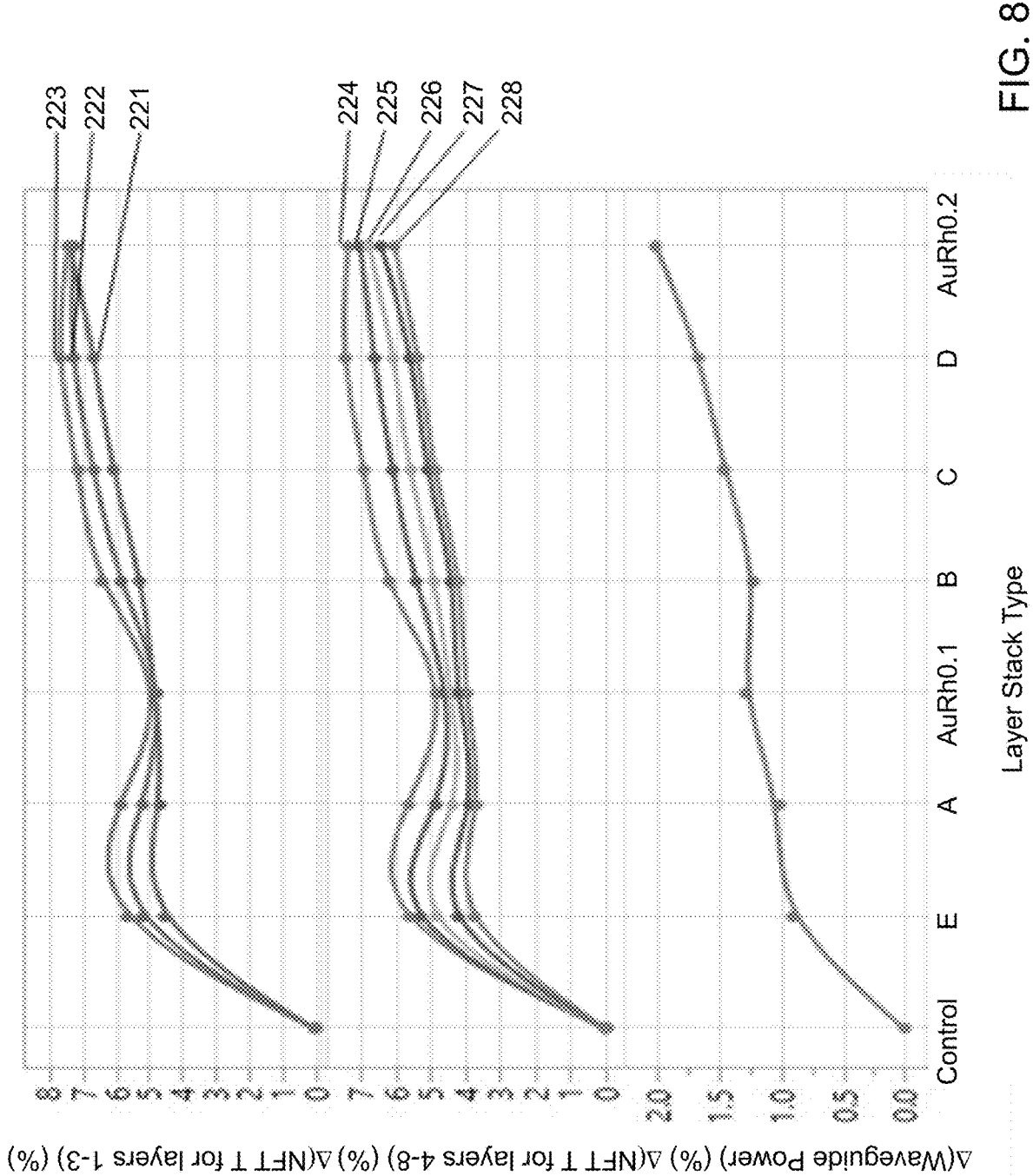
FIG. 8 is a first graph illustrating characteristics of sample layer stacks described in Table 1.
Figure 9:
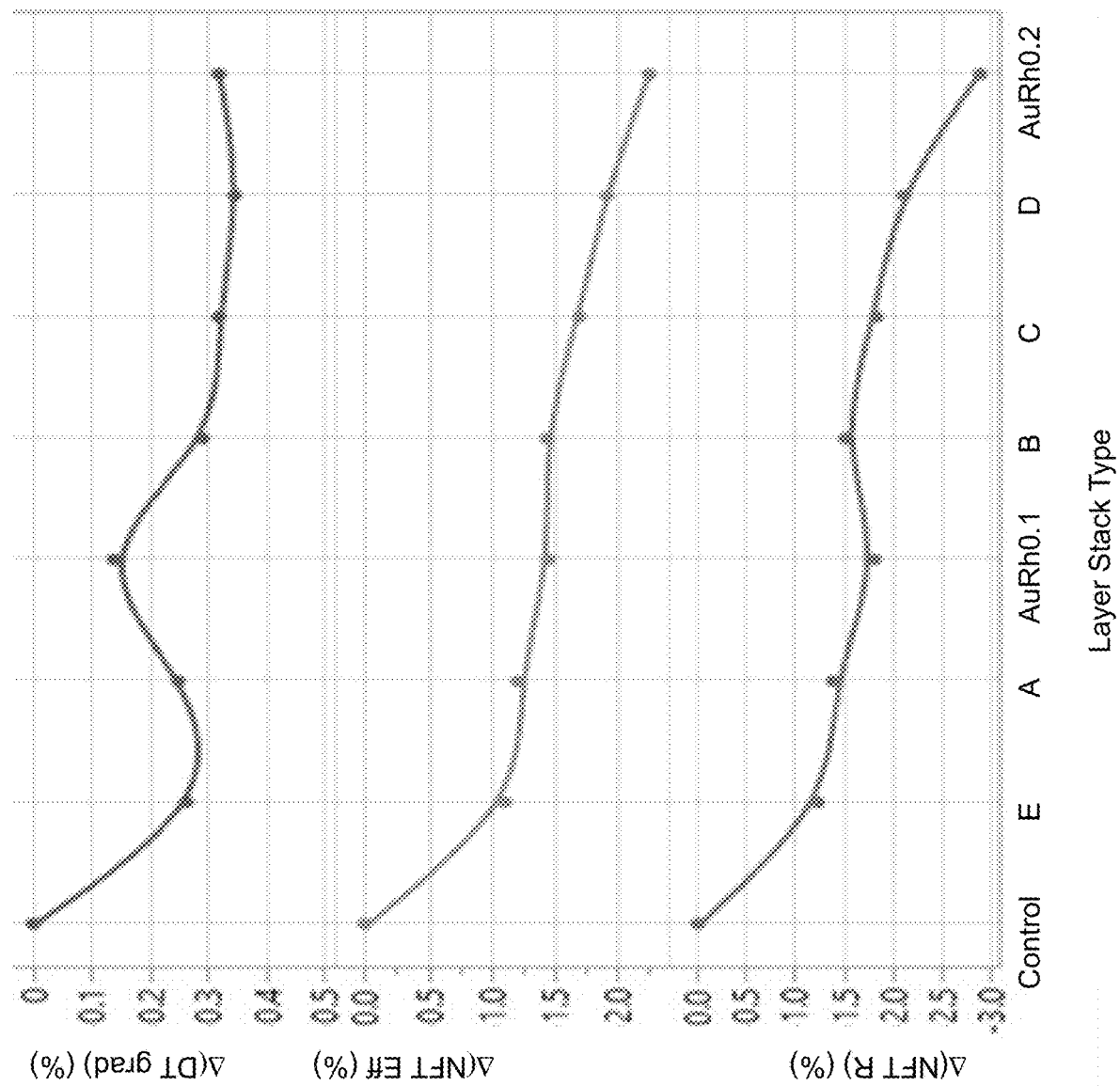
FIG. 9 is a second graph illustrating additional characteristics of the sample layer stacks described in Table 1.

FIGS. 8 and 9 are graphs illustrating characteristics of the various Exemplary Samples of the embodiments of the present disclosure described in Table 1, the Control Sample (labeled as "Control"), the Second Comparative Exemplary Sample AuRh0.1 (labeled as "AuRh0.1"), and the Second Comparative Exemplary AuRh0.2 (labeled as "AuRh0.2"). The results are normalized to the data from the Control Sample, i.e., the sample that includes an 80 nm thick Au layer for a first portion 203 and a 20 nm thick Rh layer for a second portion 209 of the antenna 202.

Sample E has the same average Rh composition as the Comparative Exemplary AuRh0.2, but shows better NFT performance such as relatively lower NFT temperatures, higher dT gradient, higher NFT efficiency, and smaller NFT reflectance. This demonstrates that the laminated Au alloy structures with optimized graded alloy compositions such as Sample E can provide better NFT performance compared to the single-layer Au alloy structures with homogeneous alloy compositions such as the Comparative Exemplary Sample AuRh0.2.

The various gold-based layer stack 203L of the embodiments of the present disclosure can improve thermo-mechanical stability of a near field transducer 140, and therefore, can improve the reliability/lifetime performance of a HAMR write head 103 with no or little penalty on ADC performance, compared to a single gold-based layer.

The five Exemplary Samples of embodiments of the present disclosure are merely exemplary configurations. Additional configurations with different alloy compositions (e.g., complete or partial replacement of Rh with one or more other platinum group metals and/or different alloy element concentration) and different thicknesses for the component layers can be fabricated to achieve better HAMR head reliability with no or little ADC penalty.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All of the publications, patent applications and patents cited herein are incorporated herein by reference in their entirety.

What is claimed is:

1. A heat assisted magnetic recording (HAMR) write head comprising:
    a main pole;
    a waveguide; and
    a near-field transducer comprising:
        an antenna disposed between the waveguide and the main pole; and
        a thermal shunt in direct contact with the antenna, wherein:
            a first portion of the antenna includes a layer stack of three or more gold-based component layers that contain a waveguide-side outermost gold-based component layer, a pole-side outermost gold-based component layer, and one or more intermediate gold-based component layers;
            a second portion of the antenna is disposed between the first portion of the antenna and the main pole, the second portion comprising a metallic material having a higher melting point than gold, wherein the pole-side outermost gold-based component layer and the one or more intermediate gold-based component layers are in direct contact with the second portion of the antenna and the thermal shunt; and
            an intermediate gold-based component layer of the one or more intermediate gold-based component layers includes at least one platinum group metal (PGM) at a maximum total atomic percentage that is greater than a total atomic percentage of the at least one PGM in the waveguide-side outermost gold-based component layer and is greater than a total atomic percentage of the at least one PGM in the pole-side outermost gold-based component layer.

2. The HAMR write head of claim 1, wherein:
    the maximum total atomic percentage of the at least one PGM in the intermediate gold-based component layer is in a range from 0.2% to 0.5%; and
    the PGM comprises Rh.

3. The HAMR write head of claim 1, wherein the one or more intermediate gold-based component layers comprises:
a waveguide-side PGM-containing gold-based component layer that is more proximal to the waveguide than the intermediate gold-based component layer is to the waveguide; and
a pole-side PGM-containing gold-based component layer that is more proximal to the main pole than the intermediate gold-based component layer is to the main pole,
wherein each of the waveguide-side PGM-containing gold-based component layer and the pole-side PGM-containing gold-based component layer comprises the at least one PGM at a lower atomic percentage than the maximum total atomic percentage.

4. The HAMR write head of claim 1, wherein a surface segment of the waveguide-side outermost gold-based component layer forms a portion of an air bearing surface of the HAMR write head.

5. The HAMR write head of claim 1, wherein the pole-side outermost gold-based component layer is free of the at least one PGM.

6. The HAMR write head of claim 1, further comprising at least one dielectric matrix layer embedding at least a portion of the near field transducer.

7. The HAMR write head of claim 6, wherein:
the waveguide-side outermost gold-based component layer is in direct contact with the at least one dielectric matrix layer; and
the waveguide-side outermost gold-based component layer is free of the at least one PGM.

8. The HAMR write head of claim 6, wherein the thermal shunt is embedded in the at least one dielectric matrix layer.

9. The HAMR write head of claim 8, wherein the at least one dielectric matrix layer comprises:
a first dielectric matrix layer embedding the antenna; and
a second dielectric matrix layer embedding and in direct contact with the thermal shunt.

10. The HAMR write head of claim 1, wherein the metallic material of the second portion of the antenna comprises at least one material that is selected from Rh, Co, Ni, Pt, Pd, Ru, B, Mo, Nb, Ta, W, Ti, Os, Ir, or Re.

11. The HAMR write head of claim 1, wherein:
the thermal shunt is in direct contact with the pole-side outermost gold-based component layer and the intermediate gold-based component layer; and
the waveguide-side outermost gold-based component layer is not in direct contact with the thermal shunt.

12. The HAMR write head of claim 1, wherein the three or more gold-based component layers have a respective material composition of $Au_{1-x}M_x$, in which M comprises at least one of Rh, Ir, Pd or Pt, and x is in a range from 0 to 0.1, where x is greater than 0 in at least two of the three or more gold-based component layers.

13. A hard disk drive, comprising:
the HAMR write head of claim 1;
a magnetic read head; and
a magnetic media.

14. A method of forming a heat assisted magnetic recording (HAMR) write head, comprising:
forming a waveguide over a substrate;
forming a first dielectric matrix layer over the waveguide;
forming a recess cavity in the first dielectric matrix layer, the recess cavity having a tapered surface;
sequentially depositing a layer stack of three or more gold-based component layers that contain a waveguide-side outermost gold-based component layer, a pole-side outermost gold-based component layer, and one or more intermediate gold-based component layers in the recess cavity, wherein an intermediate gold-based component layer of the one or more intermediate gold-based component layers includes at least one platinum group metal (PGM) at a maximum total atomic percentage that is greater than a total atomic percentage of the at least one PGM in the waveguide-side outermost gold-based component layer and is greater than a total atomic percentage of the at least one PGM in the pole-side outermost gold-based component layer;
removing a portion of the layer stack that overlies a top surface of the first dielectric matrix layer by performing a planarization process to form an antenna-having, the antenna comprising:
a first portion that includes a remaining portion of the layer stack after the planarization process; and
a second portion comprising a metallic material having a higher melting point than gold;
forming a second dielectric matrix layer over the antenna and the first dielectric matrix layer;
forming a thermal shunt through the second dielectric matrix layer and into the antenna; and
forming a main pole over the thermal shunt body portion, wherein:
the second portion of the antenna is disposed between the first portion of the antenna and the main pole; and
the pole-side outermost gold-based component layer and the one or more intermediate gold-based component layers are in direct contact with the second portion of the antenna and the thermal shunt.

15. The method claim 14, wherein the second portion is formed by deposition and patterning of a metallic material selected from Rh, Co, Ni, Pt, Pd, Ru, B, Mo, Nb, Ta, W, Ti, Os, Ir, or Re.

16. The method of claim 14, wherein:
the maximum total atomic percentage of the at least one PGM in the intermediate gold-based component layer is in a range from 0.2% to 0.5%; and
the PGM comprises Rh.

17. The method of claim 14, wherein the one or more intermediate gold-based component layers comprises:
a waveguide-side PGM-containing gold-based component layer that is more proximal to the waveguide than the intermediate gold-based component layer is to the waveguide; and
a pole-side PGM-containing gold-based component layer that is more proximal to the main pole than the intermediate gold-based component layer is to the main pole,
wherein each of the waveguide-side PGM-containing gold-based component layer and the pole-side PGM-containing gold-based component layer comprises the at least one PGM at a lower atomic percentage than the maximum total atomic percentage.

18. The method of claim 14, further comprising providing an air bearing surface by polishing the main pole, the second dielectric matrix layer, the antenna, and the first dielectric matrix layer, wherein a polished surface segment of the waveguide-side outermost gold-based component layer forms a portion of the air bearing surface.

\* \* \* \* \*